US012625486B2

(12) United States Patent
Wyatt et al.

(10) Patent No.: US 12,625,486 B2
(45) Date of Patent: May 12, 2026

(54) BUILDING CONSTRUCTION COMPONENTS AND METHODS

(71) Applicant: CABN CO Ltd., Toronto (CA)

(72) Inventors: Jackson Wyatt, Toronto (CA); Joseph Ashkarian, Toronto (CA)

( * ) Notice: Subject to any disclaimer, the term of this patent is extended or adjusted under 35 U.S.C. 154(b) by 693 days.

(21) Appl. No.: 17/891,327

(22) Filed: Aug. 19, 2022

(65) Prior Publication Data

US 2024/0061399 A1 Feb. 22, 2024

(51) Int. Cl.
 *G06F 30/13* (2020.01)
 *G05B 19/4099* (2006.01)

(52) U.S. Cl.
 CPC ................... *G05B 19/4099* (2013.01); *G05B 2219/49023* (2013.01)

(58) Field of Classification Search
 CPC .. G05B 19/4099; G06F 2111/20; G06F 30/13
 See application file for complete search history.

(56) References Cited

U.S. PATENT DOCUMENTS

| | | | | | |
|---|---|---|---|---|---|
| 7,873,490 | B2 * | 1/2011 | MacDonald | .......... | G01J 1/4228 |
| | | | | | 356/218 |
| 7,912,807 | B2 * | 3/2011 | McLean | ................. | G06Q 50/06 |
| | | | | | 706/52 |
| 8,204,619 | B2 * | 6/2012 | Heil | ........................ | G06F 30/13 |
| | | | | | 700/98 |
| 11,913,227 | B2 * | 2/2024 | Leahy | .................... | B32B 13/10 |
| 2008/0249756 | A1 * | 10/2008 | Chaisuparasmikul | .. | G06F 30/20 |
| | | | | | 703/13 |

| | | | | | |
|---|---|---|---|---|---|
| 2015/0135634 | A1 * | 5/2015 | Hoie | ........................ | E04C 2/243 |
| | | | | | 52/745.05 |
| 2018/0230692 | A1 * | 8/2018 | Thebaud | ............. | E04B 1/34861 |
| 2018/0239840 | A1 * | 8/2018 | Santarone | ............... | G06T 19/00 |

OTHER PUBLICATIONS

"CLT Cross Contaminated Timber Sustainability," Web page <http://www.cltcrosslaminatedtimber.com.au/clt/sustainable>, 2 pages, prior to Aug. 19, 2022, retrieved on Nov. 17, 2022.
"United Nations Sustainable Goals Development," Web page <https://sdgs.un.org>, 6 pages, retrieved from Internet Archive Wayback Machine <https://web.archive.org/web/20220815012834/https://sdgs.un.org/> on Nov. 17, 2022.

* cited by examiner

*Primary Examiner* — Alvin H Tan
(74) *Attorney, Agent, or Firm* — Bennett Jones LLP; Lorelei G. Graham

(57) ABSTRACT

A method for constructing a pre-fabricated component of a building, including: configuring a pre-fabricated component of a building based on energy informed modelling; wherein the pre-fabricated component is able to be assembled with at least one other pre-fabricated component into the building at a final site for the building. A method for constructing a building, including: performing site analysis to determine at least one environmental condition; and optimizing at least one pre-fabricated component of the building based on energy informed modelling based on one or more of historical data of a location of the building, weather patterns of the location, climate data of the location, temperature data of the location, solar data of the location, orientation data of the location, occupancy rate of the building, building insulation data, ventilation and infiltration data, exterior fenestration, shades implementation, or pre-fabricated component configuration.

12 Claims, 33 Drawing Sheets

Panel with rigid insulation and timber cladding. U value = approx. 0.13

Mineral / clay/ plaster lining board

60mm service zone, insulated 60 x 60mm counter battens

90mm crosslam timber panel

200mm wood fibre insulation board

22mm impregnated wood fibre insulation board

Timber cladding

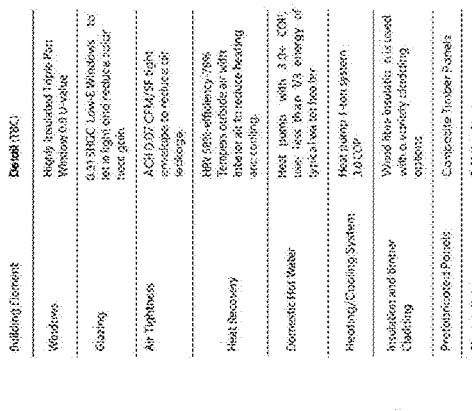
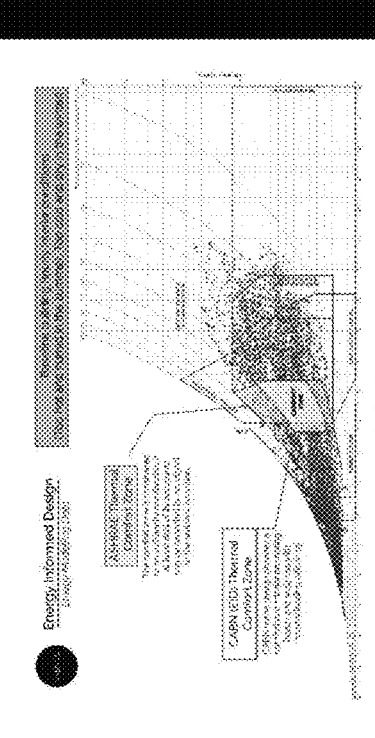
FIG. 16

The site-specific modeling comfort zone is maintained through building design and the CABN component configuration, allowing decreased energy consumption for heating and cooling systems. The energy data technology is a progressive improvement on interior conditions, as seen in a baseline 600 sq ft Energy Efficient Building Design (6485kWh/year) vs. the resulting CABN EID energy informed designed buildings (2404 kWh/year)

CABN is considered a Net-positive Energy Building when applying thermal bridge free components, airtight construction, electric systems with heat exchange ventilation and on/site renewable energy generation within the building elements.

| Building Element | Detail (TBC) |
|---|---|
| Windows | Highly Insulated Triple Pan Window 0.8 U-value |
| Glazing | 0.31 SHGC Low-E Windows to let in light and reduce solar heat gain |
| Air Tightness | ACH 0.07 CFM/SF tight envelope to reduce air leakage. |
| Heat Recovery | HRV 58% efficiency-78% Tempers outside air with interior air to reduce heating and cooling. |
| Domestic Hot Water | Heat pump with 3.0+ COP, uses less than 1/3 energy of typical water heater |
| Heating/Cooling System | Heat pump 1-ton system 3.0 COP |
| Insulation and timber Cladding | Wood fibre insulatio n is used with a variety cladding options. |
| Prefabricated Panels | Composite Timber Panels |
| Photovoltaic | 7-10 Kw Array |

FIG. 17

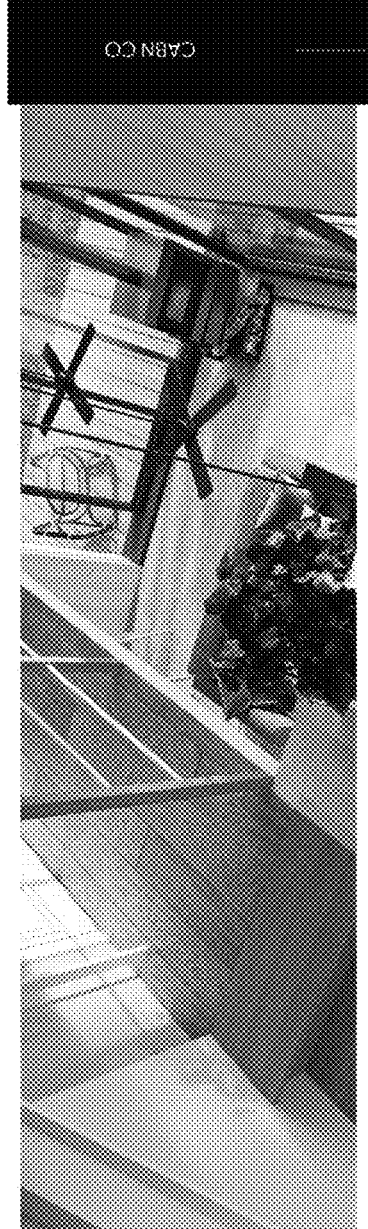
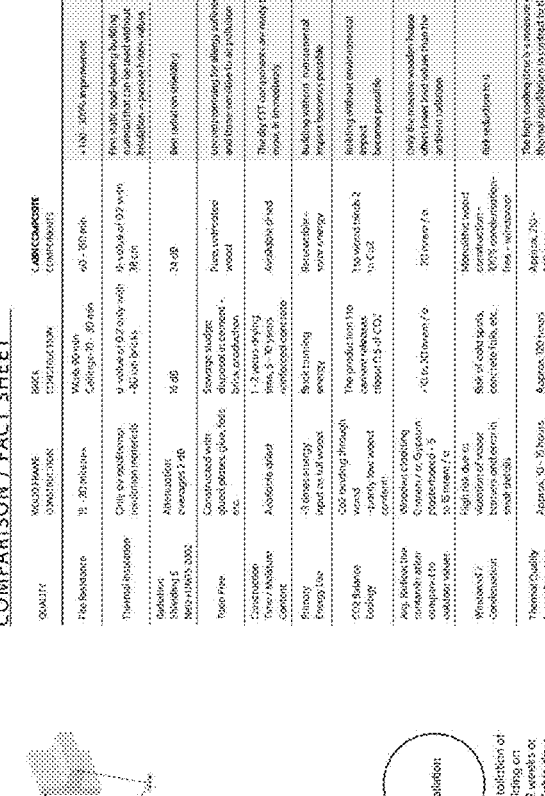
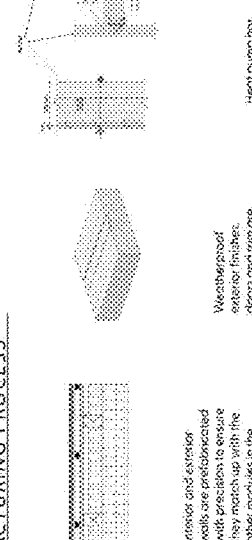
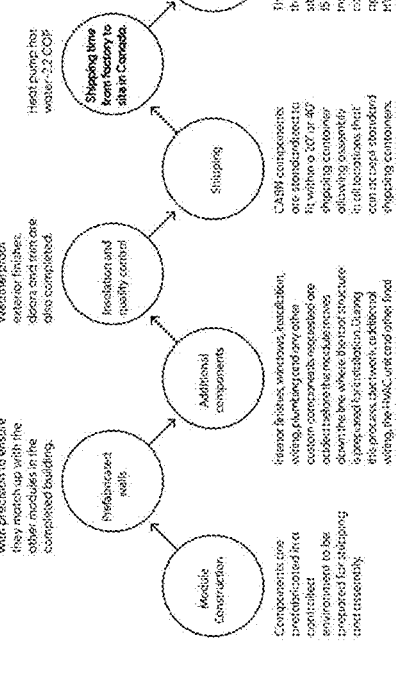
FIG. 18

| QUALITY | WOOD FRAME CONSTRUCTION | BRICK CONSTRUCTION | CABR COMPOSITE COMPONENTS | |
|---|---|---|---|---|
| Fire Resistance | 15 - 30 minutes | Walls 90 min; Ceilings 10 - 30 min | 60 - 150 min | +100 - 300% improvement |
| Thermal Insulation | Only by additional insulation materials | U-value of 0.2 only with ~80 cm bricks | U-value of 0.2 with 38 cm | First static load-bearing building material that can be used without insulation = passive house values |
| Radiation Shielding E Nato+UMTS 2002 | Attenuation coverage ≥ 2 dB | 16 dB | 34 dB | Best radiation shielding |
| Toxin Free | Constructed with glued plates, glue, foils, etc. | Sewage sludge disposal in cement + brick production | Pure, untreated wood | Uncompromising for allergy sufferers and those sensitive to air pollution |
| Construction Time / Moisture Content | Available dried | 1 - 2 years drying time, 5 - 10 years reinforced concrete | Available dried | The dry CLT components are ready to move in immediately |
| Primary Energy Use | ~3 times energy input as full wood | Brick burning energy | Renewable - solar energy | Building without environmental impact becomes possible |
| CO2 Balance Ecology | Co2 binding through wood - partly low wood content! | The production I to cement releases about 0.5 of CO2 | 1 to wood binds 2 to Co2 | Building without environmental impact becomes possible |
| Avg. Radioactive contamination compared to outdoor values | Wooden cladding 0 mrem / a, Gypsum plasterboard + 5 to 15 mrem / a | + 10 to 30 mrem / a | ~20 mrem / a | Only the massive wooden house offers lower load values than the ambient radiation |
| Windproof / Condensation | High rise due to violation of vapor barriers and error in small details | Risk of cold spots, concrete foils, etc. | Monolithic wood construction - 100% condensation-free + windproof | Risk reduction to 0 |
| Thermal Quality (in cooling time) | Approx. 10 - 15 hours | Approx. 120 hours | Approx. 240 - 360 hours | The high cooling time is a measure of thermal equilibrium in contrast to the "barrack climate" |
| Wall Surface (after 3 hours of heating) | About 21° Celsius | About 8° Celsius | About 21° Celsius | The best comfort is offered by CLT wall component |
| Wall surface after 210 hours (no heat, outdoor ≈ 10° C) | About ~ 8° Celsius | ~5.5° Celsius | ~ 6° Celsius | The best comfort is offered by the CLT wall component |
| Soundproofing | The lightness of the system is a disadvantage | Brick building is state of the art | Solid wood reaches brick values | CLT components are practically equivalent to solid construction |

FIG. 19

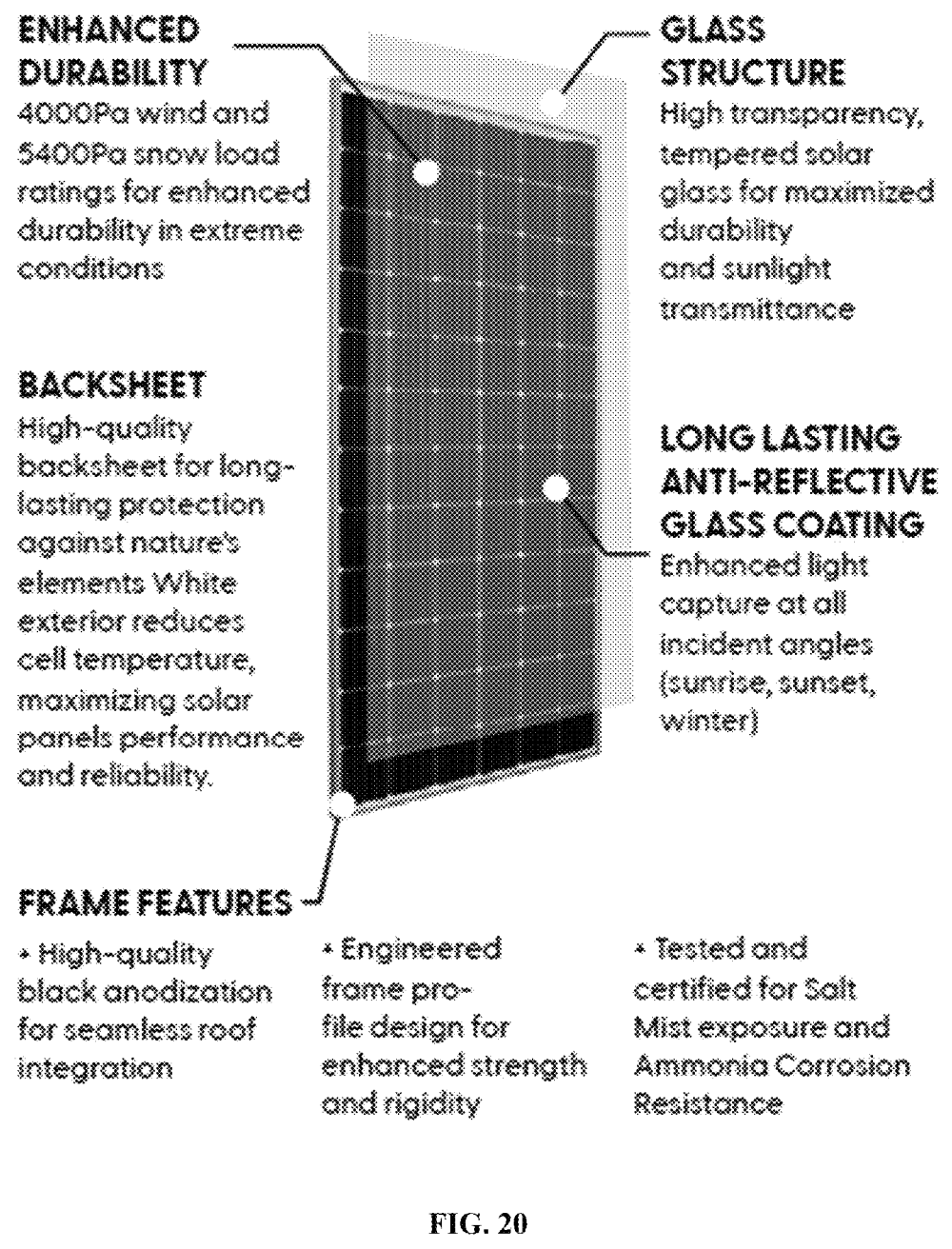

ENHANCED DURABILITY
4000Pa wind and 5400Pa snow load ratings for enhanced durability in extreme conditions

GLASS STRUCTURE
High transparency, tempered solar glass for maximized durability and sunlight transmittance

BACKSHEET
High-quality backsheet for long-lasting protection against nature's elements White exterior reduces cell temperature, maximizing solar panels performance and reliability.

LONG LASTING ANTI-REFLECTIVE GLASS COATING
Enhanced light capture at all incident angles (sunrise, sunset, winter)

FRAME FEATURES

* High-quality black anodization for seamless roof integration

* Engineered frame pro-file design for enhanced strength and rigidity

* Tested and certified for Salt Mist exposure and Ammonia Corrosion Resistance

FIG. 20

Roof slope and
orientation optimized
to the solar azimuth of
North American
Homes.

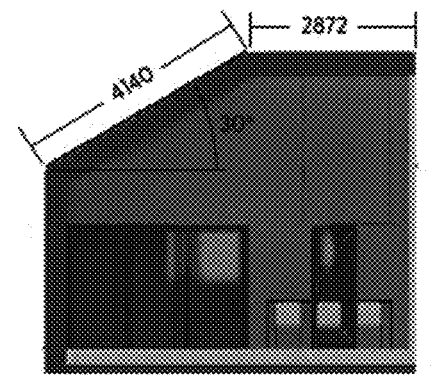
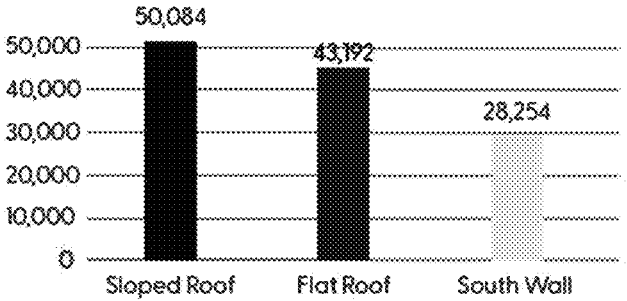
Total yearly building surface solar energy resource with the dimensions based in Toronto.
FIG. 22

BENEFITS OF ENERGY EFFICIENCY
Reduce energy
poverty
Reduce
operating and
maintenance
costs
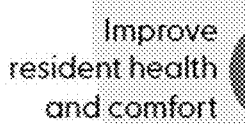
Combine
energy retrofits
with planned
upgrades
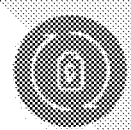
SUSTAINABLE
DEVELOPMENT
GOALS
Improve
resident health
and comfort
Improve
climate
resilience
Demonstrate
leadership
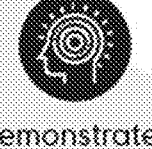
Plan for the
future
FIG. 33

BUILDING CONSTRUCTION COMPONENTS AND METHODS

FIELD

The present specification relates generally to construction, and more specifically to components for construction.

BACKGROUND

Constructing a home can be costly, energy inefficient, and expensive.

SUMMARY

In accordance with an aspect, there is provided a method for constructing a pre-fabricated component of a building, including: configuring a pre-fabricated component of a building based on energy informed modelling; wherein the pre-fabricated component is able to be assembled with at least one other pre-fabricated component into the building at a final site for the building.

In some embodiments, the pre-fabricated component is sized and dimensioned to fit within a standard shipping container;

In some embodiments, the pre-fabricated component comprises one or more of a window, door, solar panel, integrated energy system, floor, hydraulic floor heating system, wall, or a roof.

In some embodiments, the pre-fabricated component comprises at least one cross laminated timber walls optimized for energy efficiency.

In some embodiments, the pre-fabricated component comprises at least one renewable energy system.

In some embodiments, a foundation for the building comprises helical piles.

In some embodiments, the pre-fabricated component is configured with energy informed design software.

In some embodiments, the pre-fabricated component is a roof containing a solar panel.

In some embodiments, the building is configured based on energy informed modelling of the final site based on one or more of historical data of the final site, weather patterns of the final site, climate data of the final site, temperature data of the final site, solar data of the final site, orientation data of the final site, occupancy rate of the building, building insulation data, ventilation and infiltration data, exterior fenestration, shades implementation, or pre-fabricated component configuration.

In accordance with an aspect, a method for constructing a building includes: performing site analysis to determine at least one environmental condition; and optimizing at least one pre-fabricated component of the building based on energy informed modelling based on one or more of historical data of a location of the building, weather patterns of the location, climate data of the location, temperature data of the location, solar data of the location, orientation data of the location, occupancy rate of the building, building insulation data, ventilation and infiltration data, exterior fenestration, shades implementation, or pre-fabricated component configuration.

In some embodiments, the optimizing configures a comfort zone temperature, wherein temperature within the building is maintained within the comfort zone.

In some embodiments, the optimizing comprises one or more of selection, placement, or insulation of at least one pre-fabricated component of the building based on a solar azimuth of the latitude of the location of the building averaged over the year, adjusted for acceptable variation.

In some embodiments, the optimizing comprises one or more of selection, placement, or insulation of at least one pre-fabricated component of the building based on one or more of historical climate, weather, or solar data for the location of the building.

In some embodiments, the optimizing is based on solar gain data.

In some embodiments, constructing the building includes having at least one integration with the at least one environmental condition.

In some embodiments, the at least one environmental condition comprises solar positioning.

In some embodiments, the at least one environmental condition comprises climate.

In some embodiments, the building is constructed to include one or more of rain water harvesting, grey water recycling, or low flow plumbing.

In some embodiments, the building is constructed to include at least one biophilic design component.

In some embodiments, the building is constructed to include one or more of: an intelligent control system for optimizing energy consumption of the building; an automatic shading device; an automatic dimmable lighting control; automatic humidification based on a monitored climate condition; automatic energy consumption control based on a monitored climate condition; or a heat recovery ventilator controllable by a learning thermostat based on behaviour of an occupant of the building.

In accordance with an aspect, there is provided the devices, assembly, system, method, computer-implemented method, and computer-implemented system, and non-transitory computer readable medium implementing one or more or all of the features described herein.

Other aspects and features and combinations thereof concerning embodiments described herein will be become apparent to those ordinarily skilled in the art upon review of the instant disclosure of embodiments in conjunction with the accompanying figures.

BRIEF DESCRIPTION OF THE DRAWINGS

The principles of the invention may better be understood with reference to the accompanying figures provided by way of illustration of an exemplary embodiment, or embodiments, incorporating principles and aspects of the present invention, and in which, according to various embodiments:

FIG. 16 shows example benefits of buildings designed using Energy Informed Design modelling;

FIG. 17 shows the particulars for different embodiments of a building;

FIG. 18 shows a process of assembling a building and a chart comparing wood frame construction, brick construction and Composite Components across different embodiments;

FIG. 19 shows a chart comparing wood frame construction, brick construction and Composite Components across different embodiments;

FIG. 20 shows energy efficient features of a solar panel;

FIG. 22 shows total annual solar energy for various building surfaces;

FIG. 33 shows an infographic on example benefits of energy efficient buildings.

DETAILED DESCRIPTION

Figure 1:
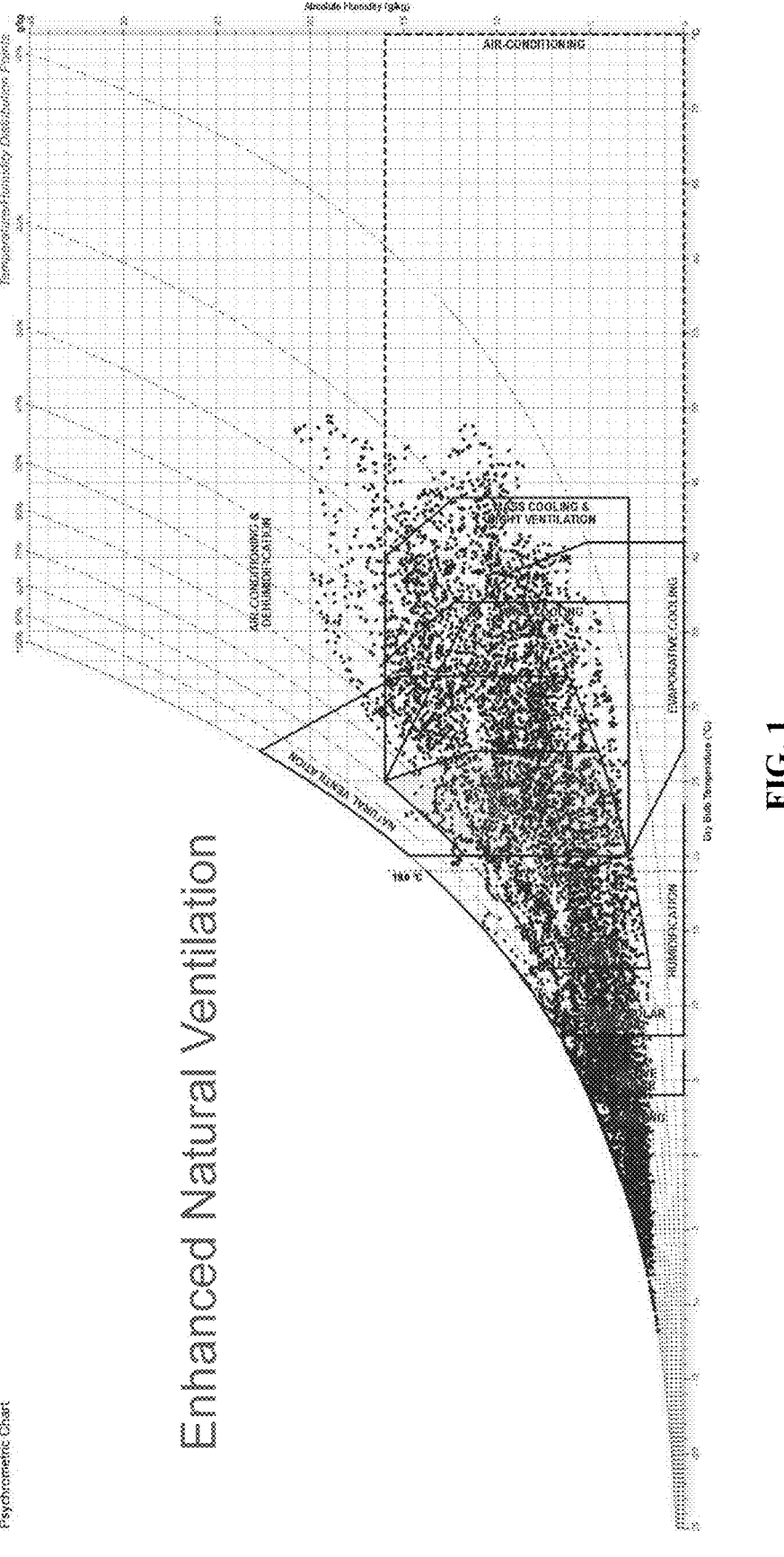
FIG. 1 shows energy modelling data in the form of a scatter plot of hourly temperature and humidity values inside a building with enhanced natural ventilation.
Figure 2:
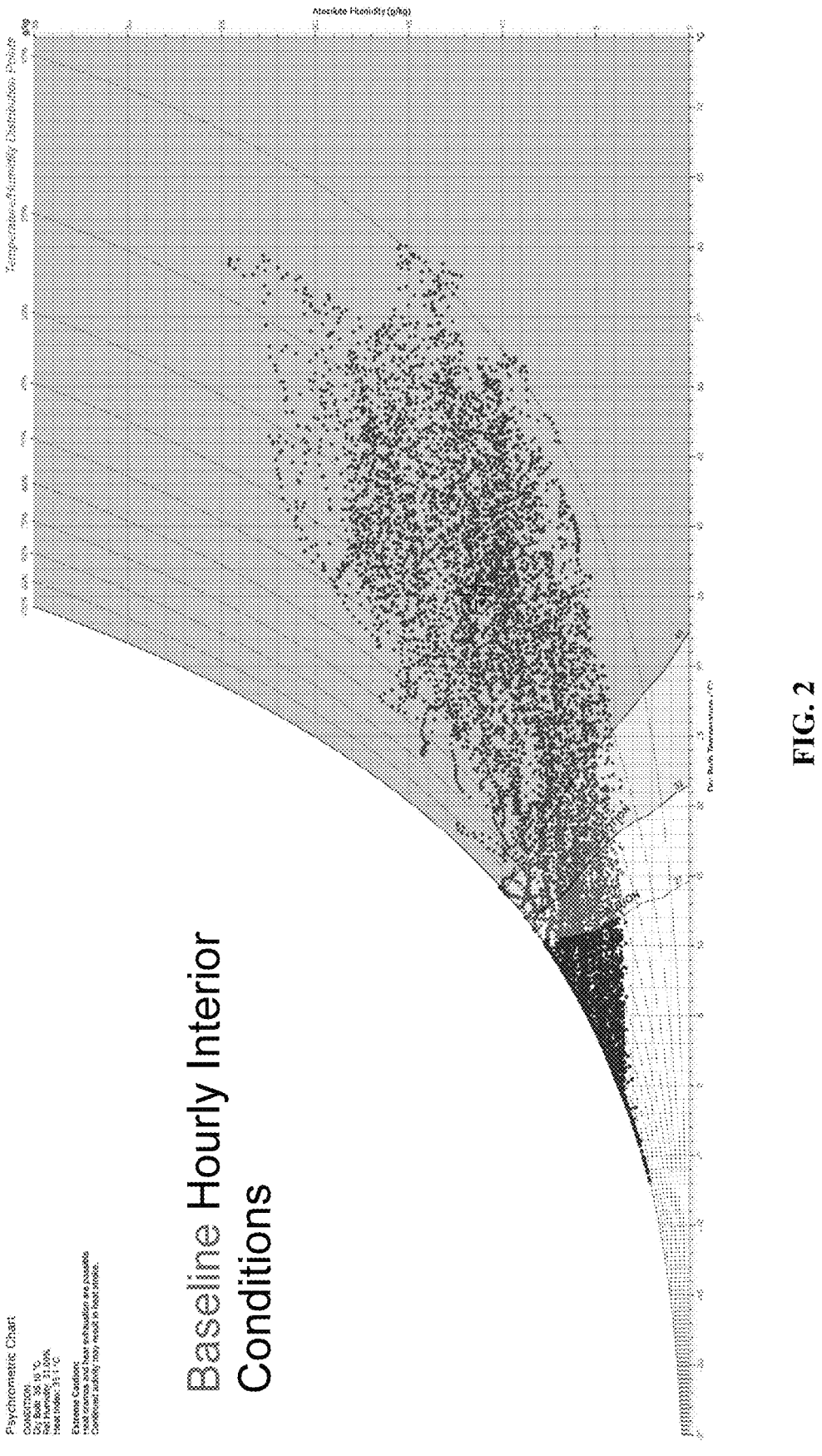
FIG. 2 shows energy modelling data in the form of a scatter plot of hourly temperature and humidity values inside a building.
Figure 3:
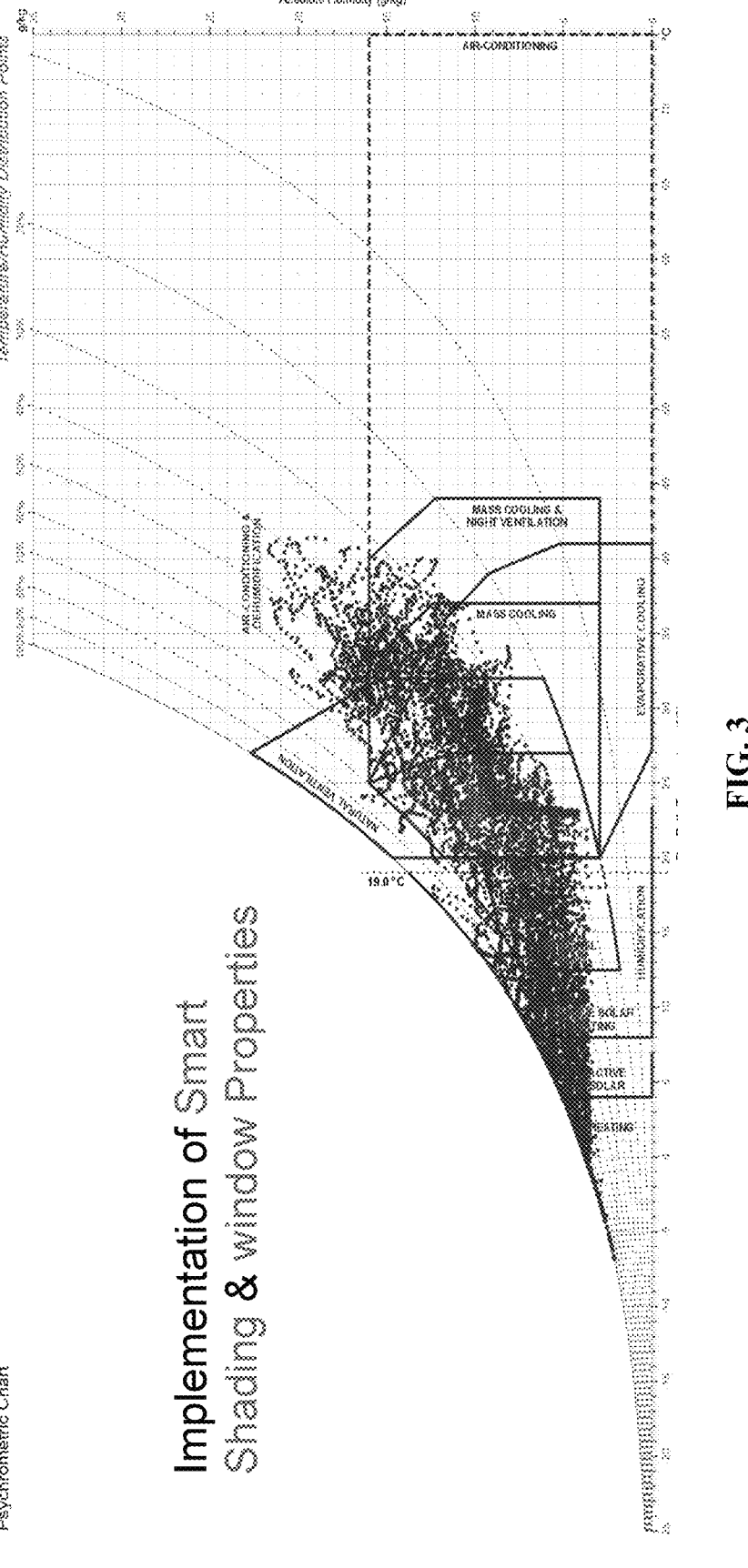
FIG. 3 shows energy modelling data in the form of a scatter plot of hourly temperature and humidity values inside a building following the implementation of smart shading and window properties.
Figure 4:
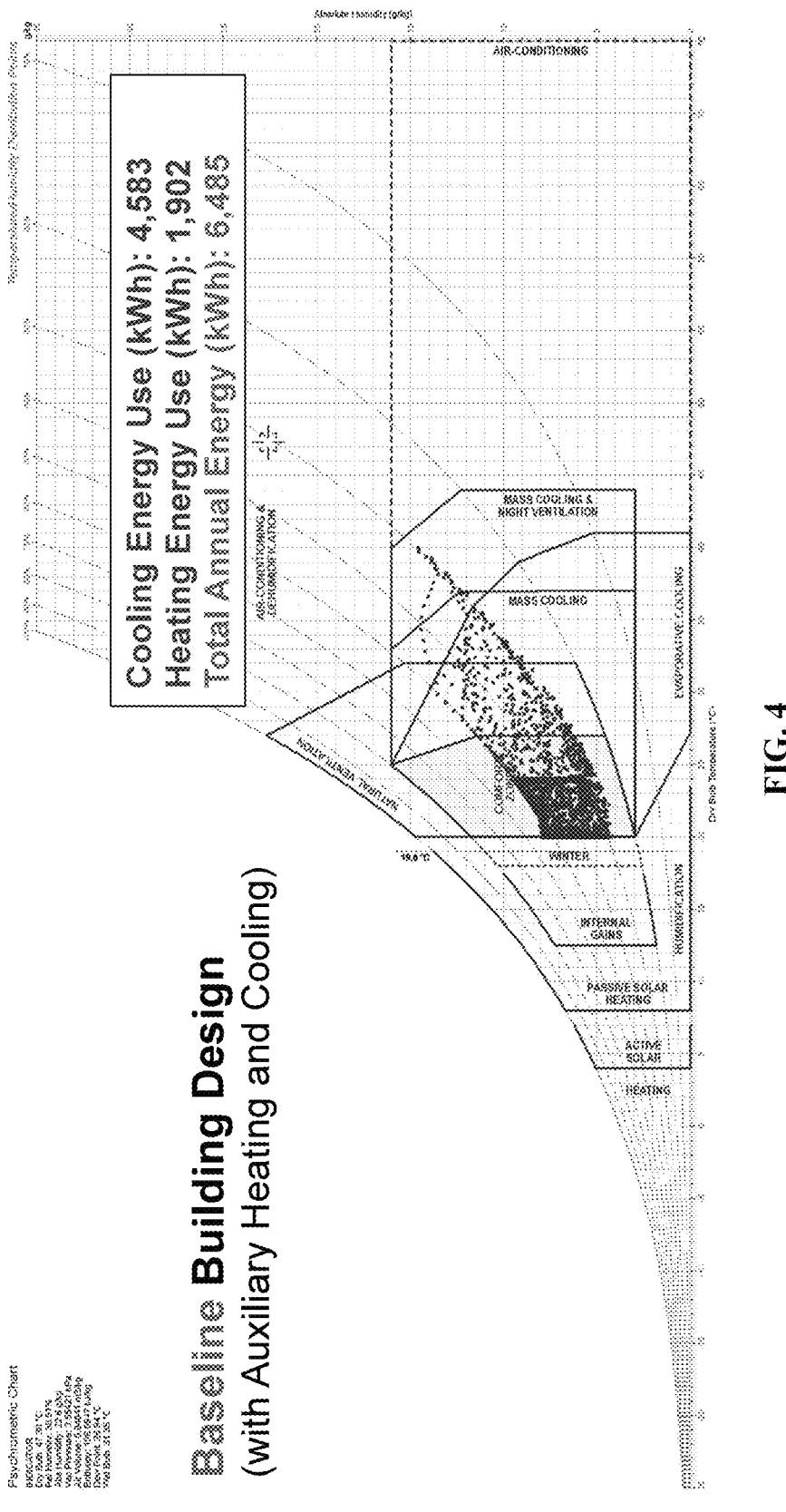
FIG. 4 shows energy modelling data in the form of a scatter plot of hourly temperature and humidity values inside a building employing auxiliary heating and cooling.
Figure 5:
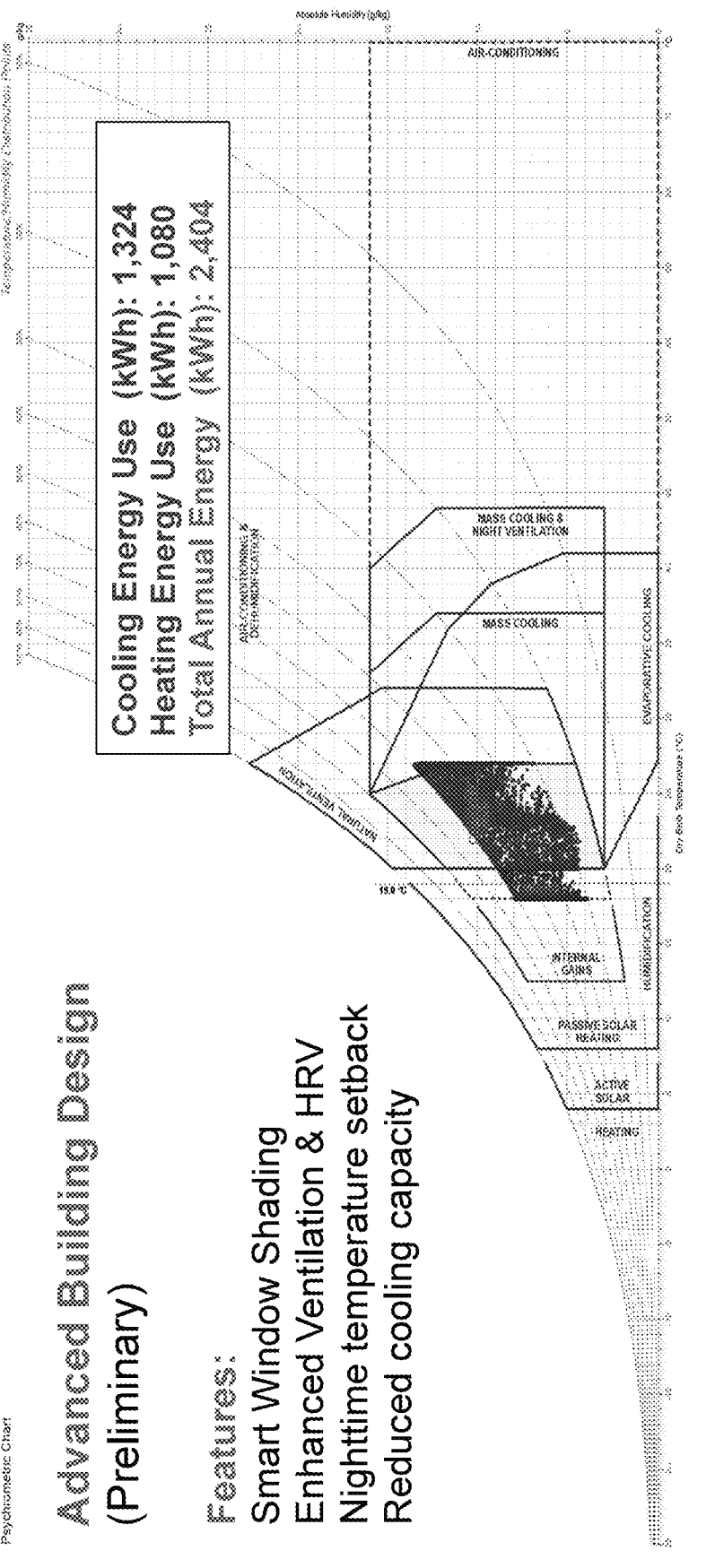
FIG. 5 shows energy modelling data in the form of a scatter plot of hourly temperature and humidity values inside a building following the implementation of smart window shading, enhanced ventilation and heat recovery ventilation, nighttime temperature setback, and reduced cooling capacity.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

According to an embodiment, prefabricated energy efficient buildings use standardized prefabricated components of a building envelope that fit within a standard shipping container and can be assembled easily on-site. This can be the final site for the building. They are configured using energy modelling to construct buildings that are highly energy efficient to the specific region of construction. The result is a mass-manufactured affordable construction process without limitations due to weather, site and construction time.

According to an embodiment, buildings can be constructed in regions with limited access to utilities and energy since when building components are assembled they are capable of being powered through minimal site specific renewable energy systems due to their energy informed modelling (EIM) design configuring the building components.

Current strategies do not take into account a complete approach to building design including sustainable and affordably mass-manufactured components shipped configured using EIM and shipped and assembled efficiently.

Strategies can use construction completely on-site or completely off-site thereby not taking advantage of shipping efficiencies and difficult to construct locations, whether it is a dense city centre or a remote location.

Strategies may not take into account a complementary affordable component strategy with EIM, which allows lower building costs and lower long term operating costs, or excess waste and construction times on site.

According to an embodiment, the technology provides sustainable and affordable housing in remote regions.

According to an embodiment, the technology standardizes building components to allow the materials, shipping, time and labour of a construction project to be reduced as well as taking those components and configuring them in the an energy efficient way to allow the building to be sustainable as well.

According to an embodiment, the technology uses energy informed modelling strategies to design standardized component modular homes in an energy efficient way thereby allowing the fabrication, shipping and assembly process to be lower in cost while the ongoing utilities and energy requirements for the buildings are reduced as well which lowers long-term home-owner costs.

According to an embodiment, standardized building components fit in a standard shipping container. According to some embodiments, the technology additionally provides energy informed modelling of these components in the most energy efficient way.

According to an embodiment, pre-fabricated components including windows, doors, solar panels, integrated energy systems, floor, hydraulic and radiant floor heating systems, floor, and roof components are provided. The components are standardized for size for containers approved for shipping anywhere in the world.

According to an embodiment, the components include solar and renewable energy systems, such as configured using EIM and/or integrated energy system(s). The components can be assembled to include any of the above.

The components can include renewable energy systems (e.g., for windows, doors, and/or roof, etc.).

According to an embodiment, a component for a roof contains solar and/or renewable energy systems. This can allow building to be completely self reliant and be built quickly anywhere in the world.

According to an embodiment, different components can be designed to accomplish different tasks or for a pre-determined purpose, with each type of component standardized. For example, there can be separate, standardized components for each of a wall, a ceiling, a floor, and a roof, such as rather than different variations of each type of component. For example, the roof component can be constructed to always contain a solar piece.

According to an embodiment, prefabricated standardized building components configured using Energy Informed Modelling (EIM) design to allow for mass-manufacture of the components at low cost, efficient and low-cost shipping of the standardized components in standard shipping containers and low-cost efficient building assembly on site quickly, such as in less than 2 weeks.

This can allow for sustainable and affordable energy efficient quick build housing.

Standardized building components are designed that fit within a shipping container and are configured using EIM. This can allow for an affordable fast-build sustainable house or other construction or building.

According to an embodiment, the components are manufactured from cross laminated timber (CLT) or other similar sustainable materials that can be mass-premanufactured in a factory. These components can fit within a 40 foot container and are precut to allow easy on-site assembly. Each component is fabricated based on EIM, according to some embodiments.

According to an embodiment, the components are assembled into prefabricated component buildings, such as according to designs for optimal comfort through seasonal variation with ideal temperatures, humidity and air changes inside the building (e.g., house). In some embodiments, EIM is performed for energy efficiency and consumption, taking into account all building design variables to produce structures that remain in the comfort zone of 21 degrees to 24 degrees with the minimal external energy parameters as follows. These components are configured with the EIM software for improved construction material and design, according to an embodiment. This can help achieve a net-zero building with a minimal carbon footprint.

According to an embodiment, EIM takes into account one or more of the following: historical data related to the location, including latitude, of the building; local weather patterns; general climate data; location-specific temperature; weather data; solar data; orientation; location; occupancy rate; building insulation values; ventilation and infiltration (economizer, air-change rate & use); exterior fenestration (SHGC, U-value, r-value, area ratio); shades implementation (fixed, moveable, size & orient, manual vs automated); and component configuration. According to a further embodiment, EIM takes into account all of the foregoing factors. By taking into account one or more of the foregoing, EIM is used to optimize roof, window, door and building composition to maintain an interior temperature of 21-24 degrees Celsius year-round with minimal energy expenditure, according to some embodiments in some buildings. Selection and/or configuration of various components and features of a building, including selection of features described herein, is based on EIM, in some embodiments.

The site-specific modelling comfort zone is maintained through building design and the component configuration, allowing decreased energy consumption for heating and cooling systems. The energy data technology is a progressive improvement on interior conditions, as seen in the baseline Passive Haus building Design (6485 kWh/year) vs. the resulting EIM energy informed designed buildings (2300 kWh/year) according to some embodiments. The comfort zone configured for a particular building using the software according to some embodiments is maintained with minimal energy input through location specific insulative properties of the floor ceiling and walls, strategic placement of windows, window shading systems, doors and roof angle, and/or other features.

These configurations can constitute an optimization of at least one pre-fabricated component of the building based on energy informed modelling based on one or more of historical data of a final site of the building, weather patterns of the final site, climate data of the final site, temperature data of the final site, solar data of the final site, orientation data of the final site, occupancy rate of the building, building insulation data, ventilation and infiltration data, exterior fenestration, shades implementation, or pre-fabricated component configuration.

According to an embodiment, a comfort zone wherein the temperature inside the building is in the range of 21 to 24 degrees Celsius is maintained with minimal energy input by modelling the required latent heat needs for the location for the building. Based on the required latent heat needs, floor, ceiling and wall components are chosen with specific insulative properties. According to a further embodiment, one or more of strategic placement of windows, window shading systems, and doors; and roof angle are used to minimize solar gain at temperatures above 24 degrees Celsius and maximize solar gain at temperatures below 21 degrees Celsius. The building composition may be optimized to the latitude's solar azimuth averaged over the entire year and compensated for with historical in-climate weather forecasts and variations in precipitation and solar variation in the extreme zones of the solar azimuth. Insulative properties of the building and components may retain heat while strategic placement of windows and doors, shading and strategic orientation of the same may manage solar gain. According to an embodiment, the software takes into account historical climate, weather, and/or solar data for the region and allows selection of the buildings components, shade systems, windows, doors, orientation and insulation to account for temperatures beyond the range of 21-24. Latitude dictates solar azimuth at different times of the year which the software takes into account when modelling for a required gain in solar gain when temperatures are below 21 degrees Celsius and a prevention of solar gain when temperatures are above 24 degrees Celsius. To manage solar gain, strategic window, door, window shade, orientation, insulation and roof angle are selected and configured. Using components with minimal waste and good shipping efficiency configured using EIM software can allow for optimization of the configuration of the building for the entire year and its variable temperature, weather, and solar exposure. The building can help reduce reliance on fossil fuels, carbon and non-renewable energy sources due to its minimal energy needs to maintain thermal comfort of 21-24 degrees Celsius, for example.

According to an embodiment, the constructed buildings can be a Net-positive Energy Building when applying thermal bridge free components, airtight construction, electric systems with heat exchange ventilation and on/site renewable energy generation within the building elements. Building elements may include one or more of triple pane −0.8 U-value windows; clear 0.31-0.55 SHGC window glazing; an air tightness value of 0.07 ACH; a 58% HRV heat recovery value and efficiency of 78%; a 2.2 COP hot water pump; a 1-ton, ductless, 3.0 COP heat pump system; a 13" joist roof with sheathing with R-39 cavity insulation; 3×7

CLT panel walls with R-37 cavity insulation; a slab on grade foundation with R-30 cavity insulation; and a 7-10 kW solar panel system.

Optimized Heating and Cooling in View of Solar Gain

According to an embodiment, heating and cooling of the buildings is optimized by taking into account solar gain. Through strategic orientation of windows, window optimization and strategic shading of windows, temperature fluctuations due to solar gain may be minimized. By limiting sun exposure, solar gain may be reduced in the summer months to avoid a building's internal temperature exceeding a high-end of the comfort zone of 21-24 degrees Celsius. By increasing sun exposure, solar gain may be exploited in the winter months as a means of passively heating the building and maintaining the building's internal temperature above 21 degrees Celsius. The effects of solar gain is used to configure one or more of strategic building, door and window orientation; wall and roof angling; window shading; and insulation, in an embodiment. Various features of a building are optimized to regulate/minimize fluctuations in peak hot and cold temperature, regulate/minimize energy consumption, and regulate/maintain thermal comfort, in an embodiment.

Mechanical Systems

According to an embodiment, heat pump technology is used to reduce the two biggest uses of electricity. Using heat pump technology may reduce energy usage to less than one-third of that associated with conventional gas or electric resistance heaters. According to an embodiment, a water heater with refrigerant R-744 is employed. R-744 has a global warming potential of 1 (compared to common refrigerant R-410a with a global warming potential of 2088). A tight, well insulated envelope and efficient heat pump units may allow for a low energy use intensity that enables the rooftop photovoltaic system to meet the building's electrical needs. With such a tight envelope and consequent low leakage, a heat recovery ventilator may be needed to bring in fresh air. According to an embodiment, the heat recovery ventilator transfers thermal energy from air leaving the building to fresh air being drawn in in order to preheat or pre-cool outside air thereby stabilizing the temperature in the building. The heat recovery ventilator may balance the ventilation and exhaust to maintain a neutral pressure inside the building. An HVAC system in the building may be controlled via a learning thermostat that will adapt to the needs of the occupant.

Internet and Smart Home Technology

According to an embodiment, occupants of the building optimize their energy consumption through smart home technology systems which collect plug load and energy heating and cooling data throughout the year. System heating and cooling setpoints may be set for 20 degrees Celsius and 24 degrees Celsius, respectively, with the system scheduled to supply heating or cooling year-round. According to an embodiment, automatic shading devices and dimmable lighting controls provide the ability to fully control an occupant's environment. Humidification may be added, depending on the climate, for increased comfort and health. According to a further embodiment, CABN uses the Starlink™ internet satellite system from SpaceX™ to deliver high speed internet, above 100 MBps, in remote areas.

Component Strategy

According to an embodiment, the components feature sustainable materials resulting in reduced carbon dioxide emissions associated with construction and a lower overall environmental impact of construction. In some embodiments, buildings constructed using the components use one or more of standardized prefabricated floor, ceiling, and wall CLT components optimized for their respective pre-determined structural, sustainable and energy-efficient qualities. These components are configured with EIM software making them the perfect construction material to achieve a net-zero building with a minimal carbon footprint. In some embodiments, this allows for easier transportation of components and assembly of buildings in remote, cost-prohibitive and difficult to construct locations. These may include high-density urban settings, remote communities, Northern communities, locations without access to utilities and underserved communities. According to an embodiment, access to sustainable and affordable housing is provided to more people across more locations in Canada and abroad.

According to an embodiment, use of CLT as the material from which the components are comprised provides a multitude of advantages in terms of performance and sustainability of the environment such as follows.

Environmentally Friendly: Wood products use less water, fuel and energy and have a smaller negative carbon footprint.

Energy efficient and Carbon Sync: Components are manufactured energy efficiently and absorb carbon dioxide.

Durable: CLT fulfils the standards for modern building material allowing the structure to be unique and intricate. So, it helps provide durable, cost effective and stylish characteristics of a building.

Recyclable: CLT is an engineered fabricated product that can produce little on-site and off-site waste. Besides this, the waste produced can be recycled by sending it back to the manufacturer for reuse or alternatively can be compressed into pallets or chips to be burned in a similar way as coal.

Sustainable disposal: CLT has a high thermal efficiency and can act as strong insulation while remaining easy to demolish within a small period of time as it can be light weight. The waste can be recycled or reused, hence, decreasing the labor costs during construction as well as deconstruction.

Design Flexibility: Thickness of CLT can be easily increased for longer life spans using less support elements in the interior of the building.

Cost Effective: According to a study performed, the cost of CLT components as compared to concrete and steel for:

i. mid-rise residential building was 15% less, ii. mid-rise non-residential and low-rise educational building was 15-50% less, iii. low-rise commercial building was 25% less; and iv. one-story industrial building was 10% less.

Figure 14:
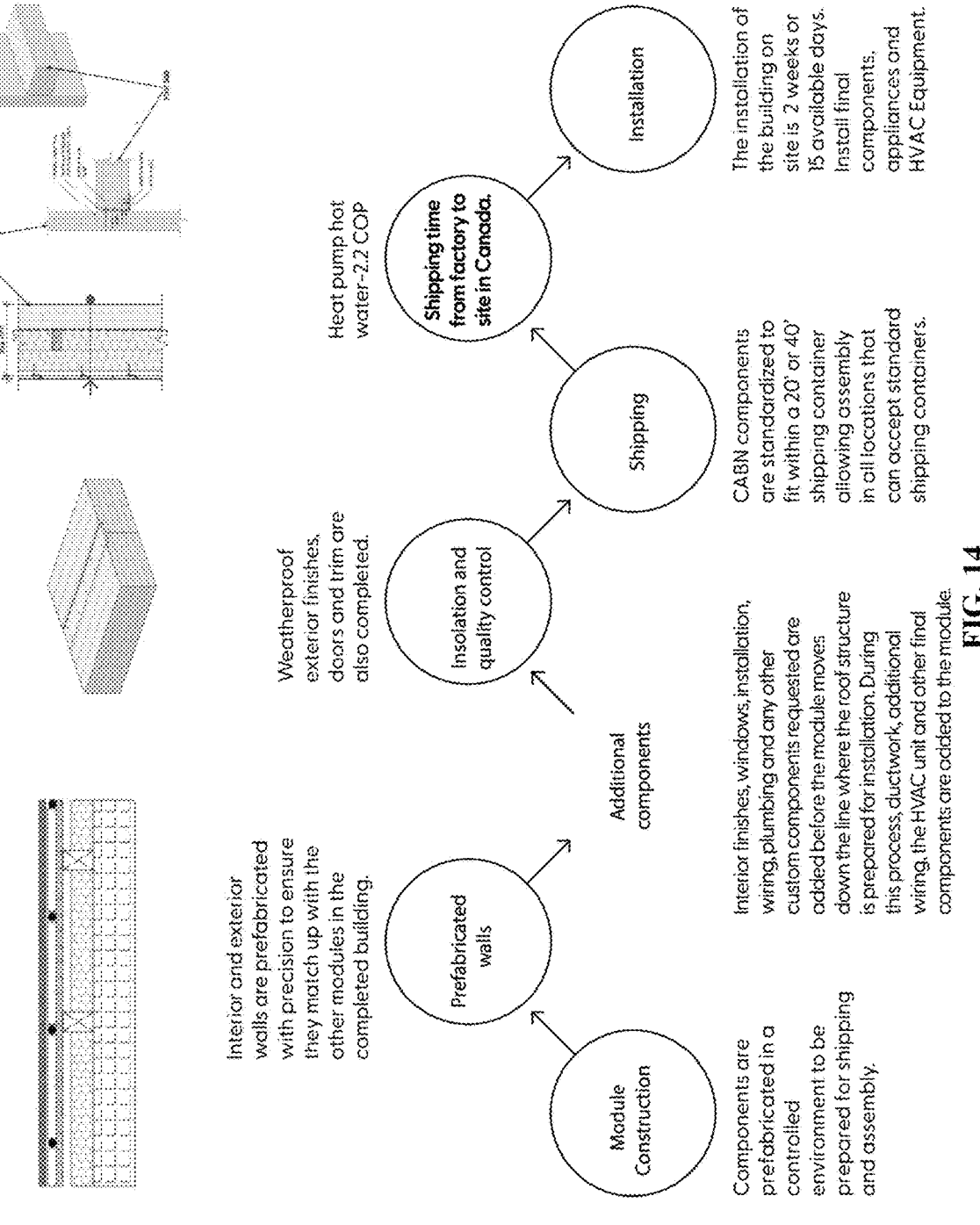
FIG. 14 shows various components of a building.

According to an embodiment, a building is manufactured according to the following process. FIG. 14 shows an example process according to some embodiments.

| | |
|---|---|
| Module Construction | Components are prefabricated affordably in a controlled environment to be prepared for shipping and assembly. According to an embodiment, components are manufactured from single sheets of cross-laminated-timber (CLT). Spaces are cut out of the sheets for fenestrations, doors and other access ports to the exterior, minimizing construction waste and improving design precision. Insulation, windows, doors, solar panels and other accessories may then be pre-installed prior to transporting the components by shipping container to the site. |
| Pre-fabricated walls | Interior and exterior walls are prefabricated with precision to ensure they will match up with the other modules in the completed building. For safety and efficiency, the walls are first prefabricated horizontally before being hoisted to their final vertical position, where they are secured to the floor. According to an embodiment, CLT components are layers of cross laminated timber adhered together to construct large durable precise sheets of wood construction materials that are adjusted and cut to specific component specifications for the later addition of insulation, windows doors, solar panels, or other components. |
| Additional components | Interior finishes, windows, installation, wiring, plumbing and any other custom components requested are added at a manufacturing plant before the module moves down the line where the roof structure is prepared for installation. During this process, ductwork, additional wiring, the HVAC unit and other final components are added to the module. The installation of the foregoing components at the manufacturing plant may reduce construction and assembly time on site. For example, according to an embodiment, the components have precision cut holes and openings and other features such as the ductwork, wiring, or HVAC system and other components can be installed on the manufacturing line rather than at site. The components are then be shipped out with the majority of finishes completed to reduce construction and assembly time onsite. |
| Insolation and quality control | Weatherproof exterior finishes, doors and trim are also completed at a manufacturing plant, manually or automatedly. According to an embodiment, the module is subsequently cleaned and subject to a quality inspection process, after which the module is delivered to the site. For example, according to an embodiment, exterior finishes, doors, trim, and other features are all completed at the manufacturing plant rather than on site. |
| Shipping | Components are standardized to fit within a 20 foot or 40 foot shipping container, according to some embodiments, allowing assembly in all locations that can accept standard shipping containers. |
| Installation | The installation of the building on site can be 2 weeks or 15 available days, for example. |

According to an embodiment, CABN units are constructed from prefabricated components shipped to site. Use of prefabricated components may facilitate fast, non-invasive assembly on site.

According to an embodiment, one or more helical piles are used as foundations for a building constructed according to an embodiment. The helical piles are a non-invasive construction technique minimizing the impact on the soil and their installations need few machines expelling carbon dioxide to the environment. The helical piles facilitate manufacturing and transportation and allow prompt installations and easy adjustments or removals. This can help reduces construction cost for the building and can be more environmentally sustainable. Helical piles foundations are cheaper than concrete, and steel structures as helical piles save installation, transportation and long-term costs since reduced mess and reusability of screw piles makes this technology quite cost-effective according to an embodiment.

Location Analysis

According to an embodiment, site analysis is performed and includes environmental survey and consultation with conservation authorities. Consultation with conservation authorities includes discussion of animal traffic flow and environmental management strategies to minimize the environmental and ecological impact of site development. Site analysis serves to identify environmental conditions at the site of a development which subsequently guide the assembly of the building, in a manner which protects the integrity of the site's natural features, and the performance of the building. Integration of the building with the environment increases home comfort and reduces long-term costs and maintenance. Using EIM and environmental strategies, one or more computer systems, including processors, can determine local patterns such as solar positioning, climate and environment conditions for the buildings to optimize comfort. EIM uses historical weather/climate data and standard latitudinal solar azimuth ranges to calculate solar gain at any point in the year. This information can then be used to optimize building configuration to maintain thermal comfort or other indicia of comfort by exploiting the sun's positioning and intensity. This data is used to regulate the internal temperature of the building and determine whether same should be elevated or reduced. In an embodiment, EIM is used to identify local patterns for a particular site, and same is used to configure the one or more components and/or buildings accordingly.

Shipping and Assembly

According to an embodiment, the components fit within a 40' shipping container and are efficiently shipped to location and result in faster construction than would be possible were everything built on site.

Waste and Water Strategy

According to an embodiment, the building and/or one or more components include the following features. According to an embodiment, rain water can be collected from the rooftop, filtered and deposited into the reservoir and subsequently used for gardening and domestic use. According to a further embodiment, greywater is treated by filtration, sedimentation, flotation, digestion and disinfection to be used for irrigation and washing. Low flow plumbing fixtures may be used to conserve water. According to an embodiment, waste water is treated via an sustainable waste water treatment plant.

Biophilic Design

According to an embodiment, the building and/or one or more components include one or more biophilic design features. Biophilic design features may include abundant natural light, green walls, green roof installations, natural building materials, components in shades of green and brown. The building and/or one or more components include colours, objects, sequences, and/or shapes selected to reflect nature.

Figure 6:
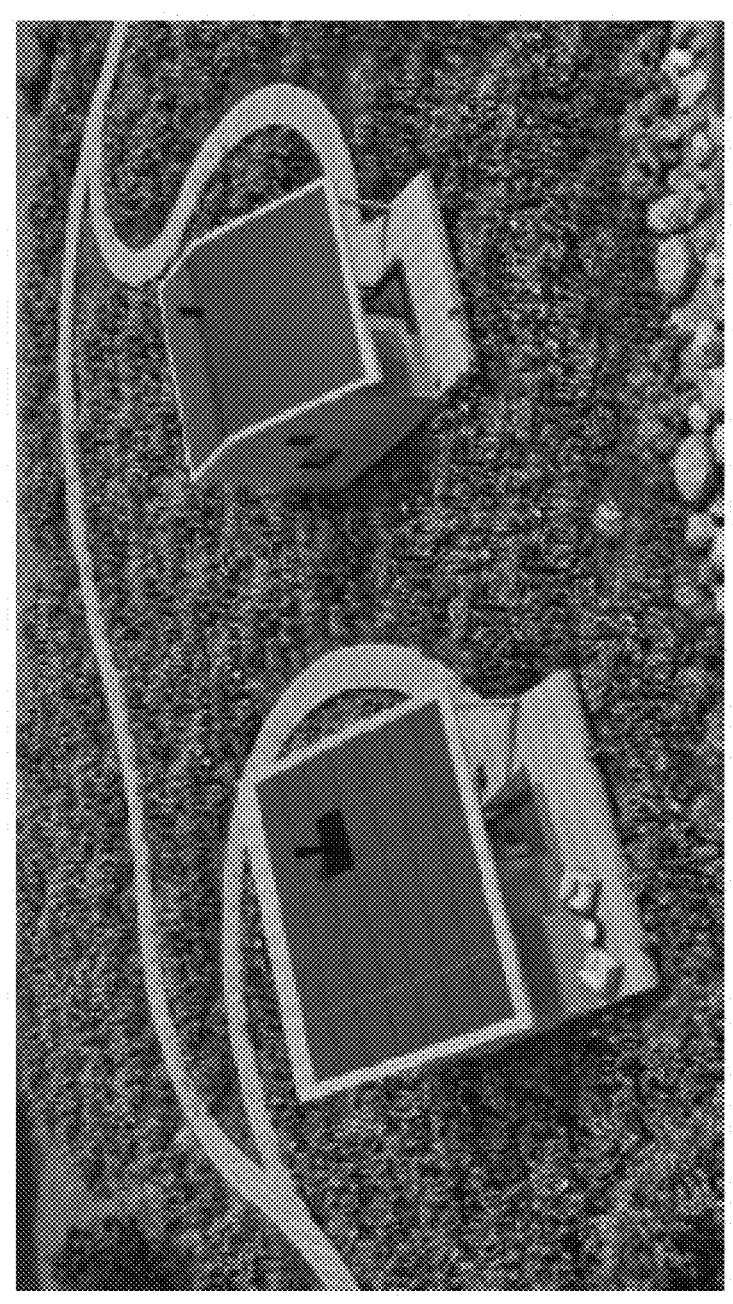
FIG. 6 shows solar panels included in a building.

According to an embodiment, FIG. 6 shows solar panels included in the building. The solar panels can be used to help the building approach net-zero energy use and efficiency.

Figure 7:
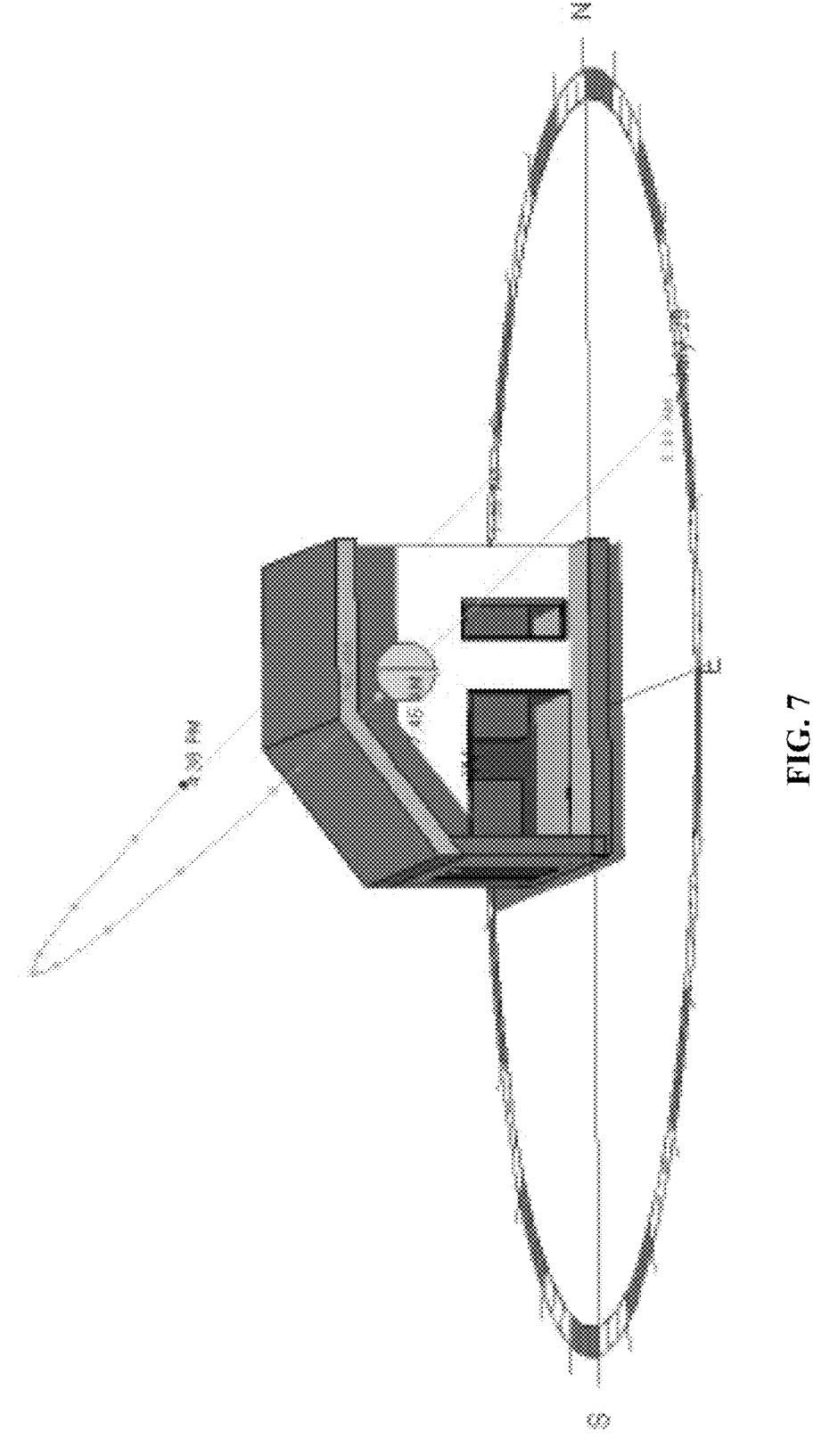
FIG. 7 shows sun azimuth and elevation at a building.

According to an embodiment, FIG. 7 shows sun azimuth and elevation at a building in July.

Figure 8:
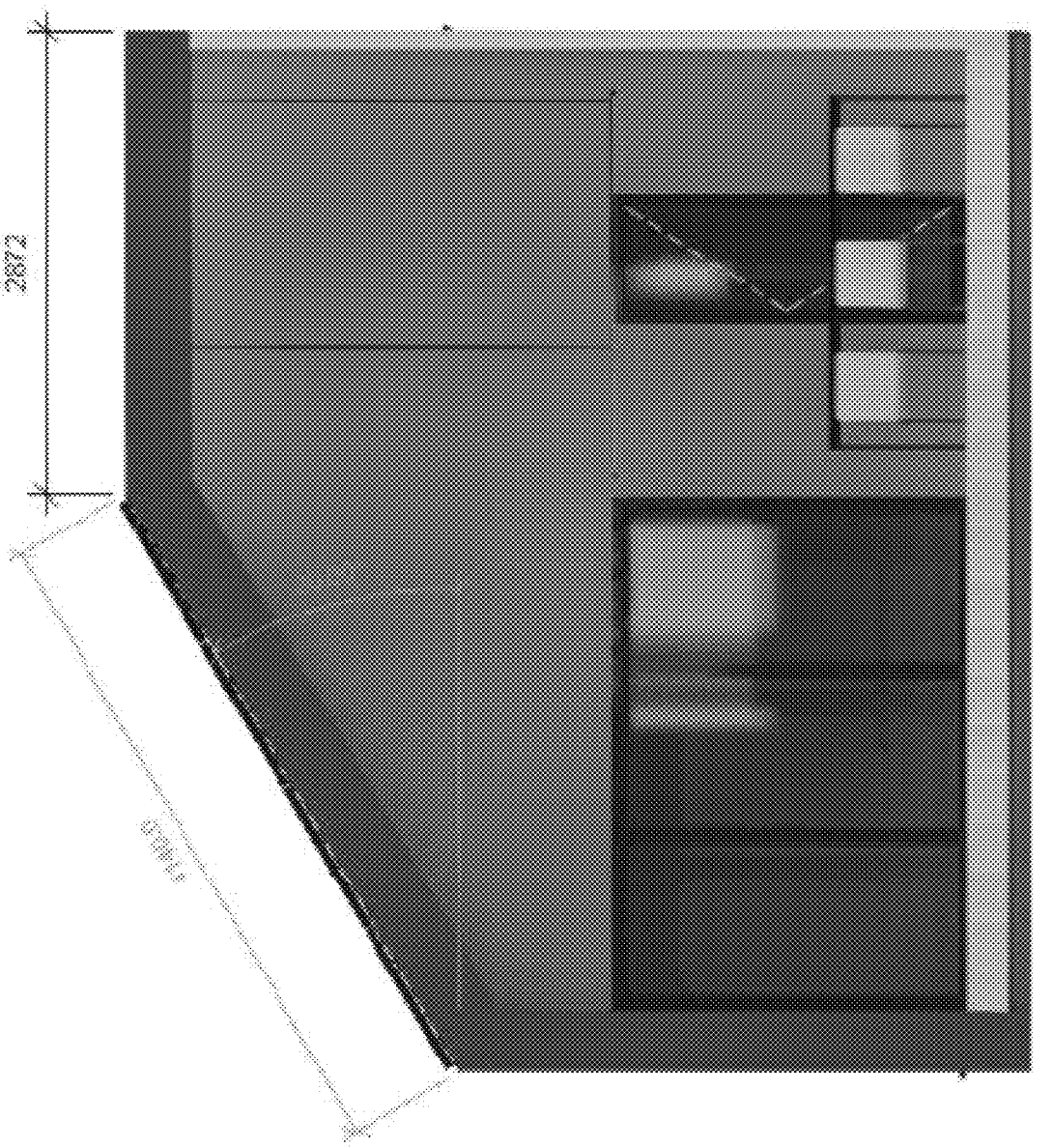
FIG. 8 shows a solar roof included in the building.

According to an embodiment, FIG. 8 shows a solar roof included in the building. The building is configured as a highly efficient building structure that reduces solar gain in summer months through shading and window placement and takes advantage of solar gain in winter months through orientation, wall and roof angles. The building reduces overall energy requirements to maintain thermal comfort while also optimizing roof orientation for peak solar energy generation all year round.

Figure 9:
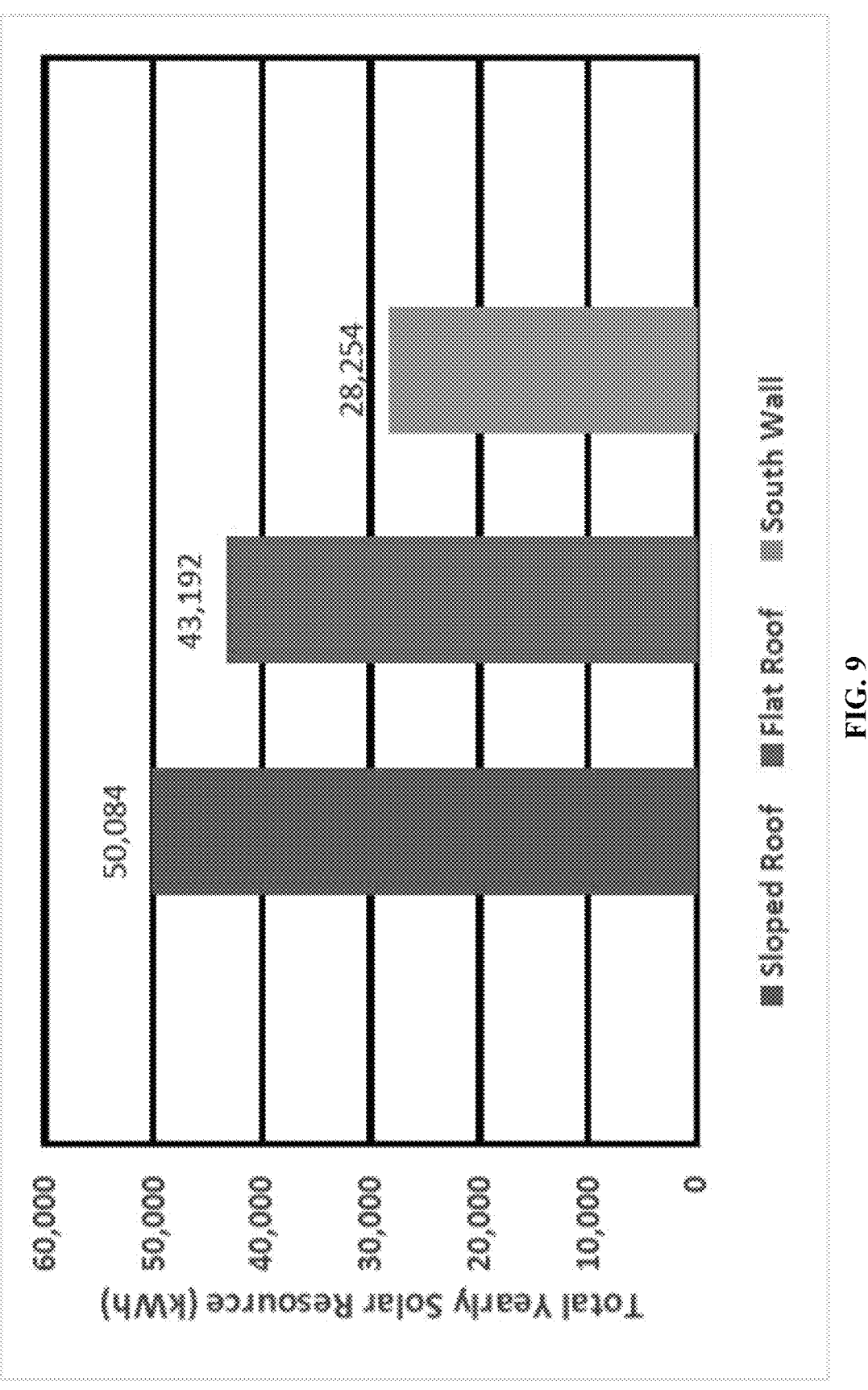
FIG. 9 shows a comparison of total yearly building surface solar energy resource for buildings having the various features.

According to an embodiment, FIG. 9 shows a comparison of total yearly building surface solar energy resource for buildings having the indicated features, a sloped roof, a flat roof, or a south wall.

Figure 10:
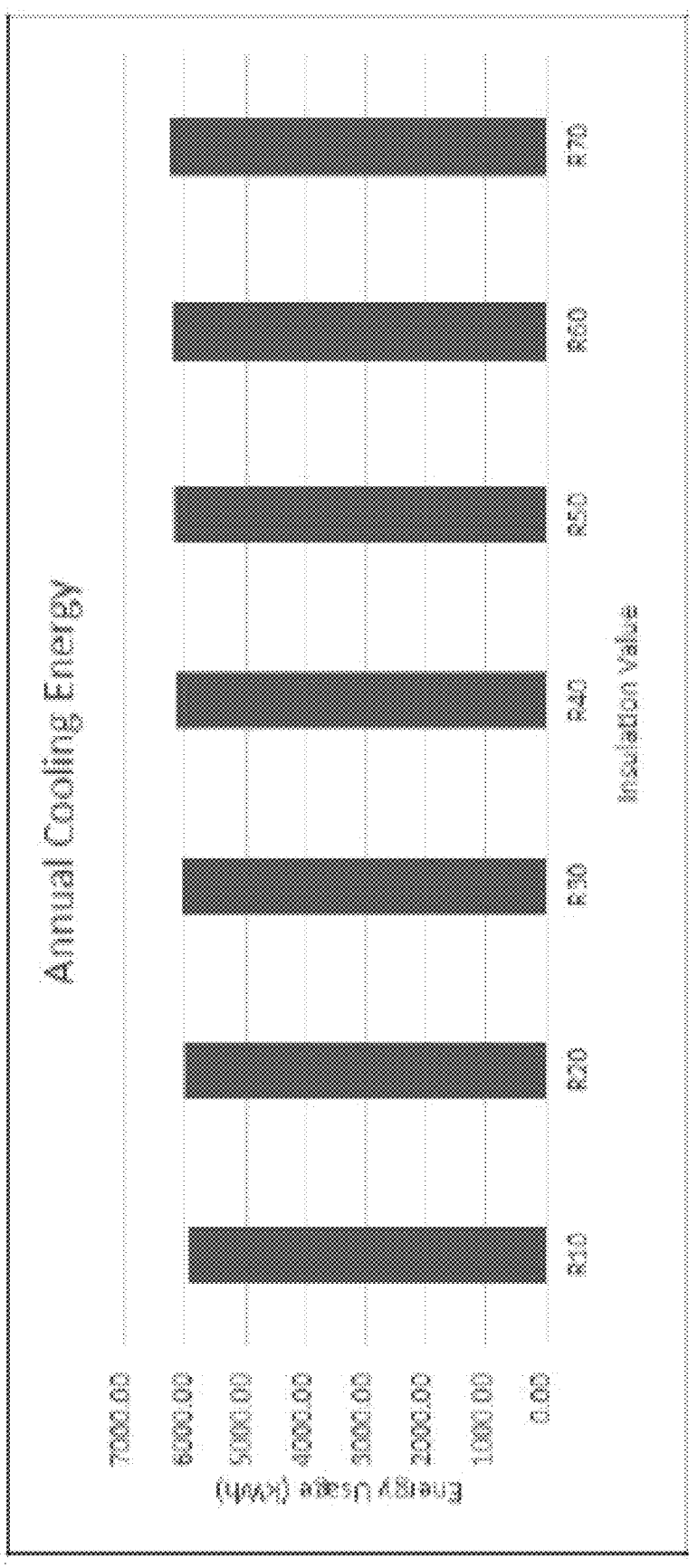
FIG. 10 shows annual cooling energy for a building having thermal bridging using glazed windows.
Figure 11:
FIG. 11 shows and annual heating energy for a building having thermal bridging using glazed windows.

According to an embodiment, FIGS. 10 and 11 show annual cooling energy and annual heating energy for a building having thermal bridging using glazed windows.

Figure 12:
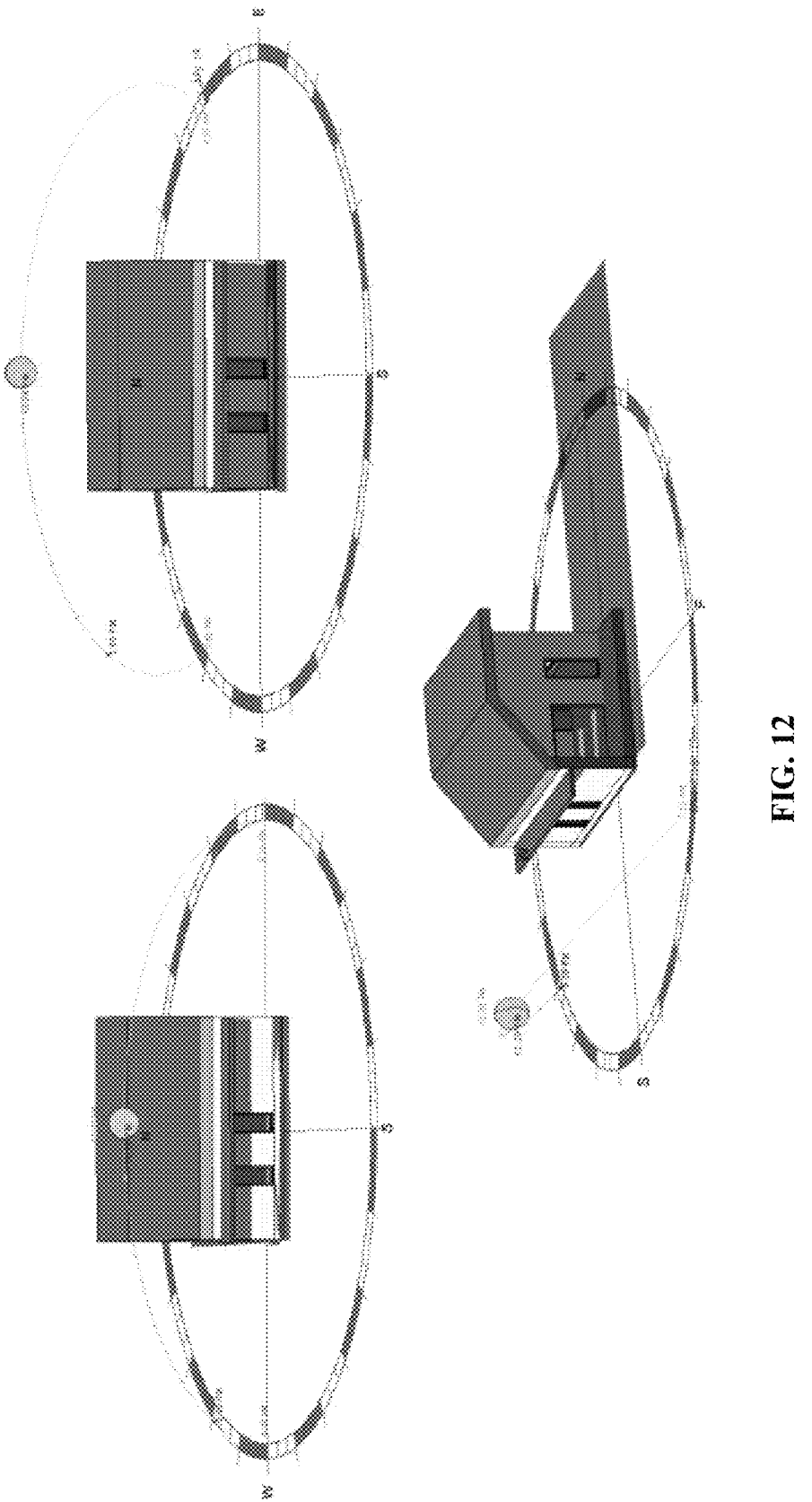
FIG. 12 shows various external shades at buildings.

According to an embodiment, FIG. 12 shows various external shades at buildings.

Figure 13:
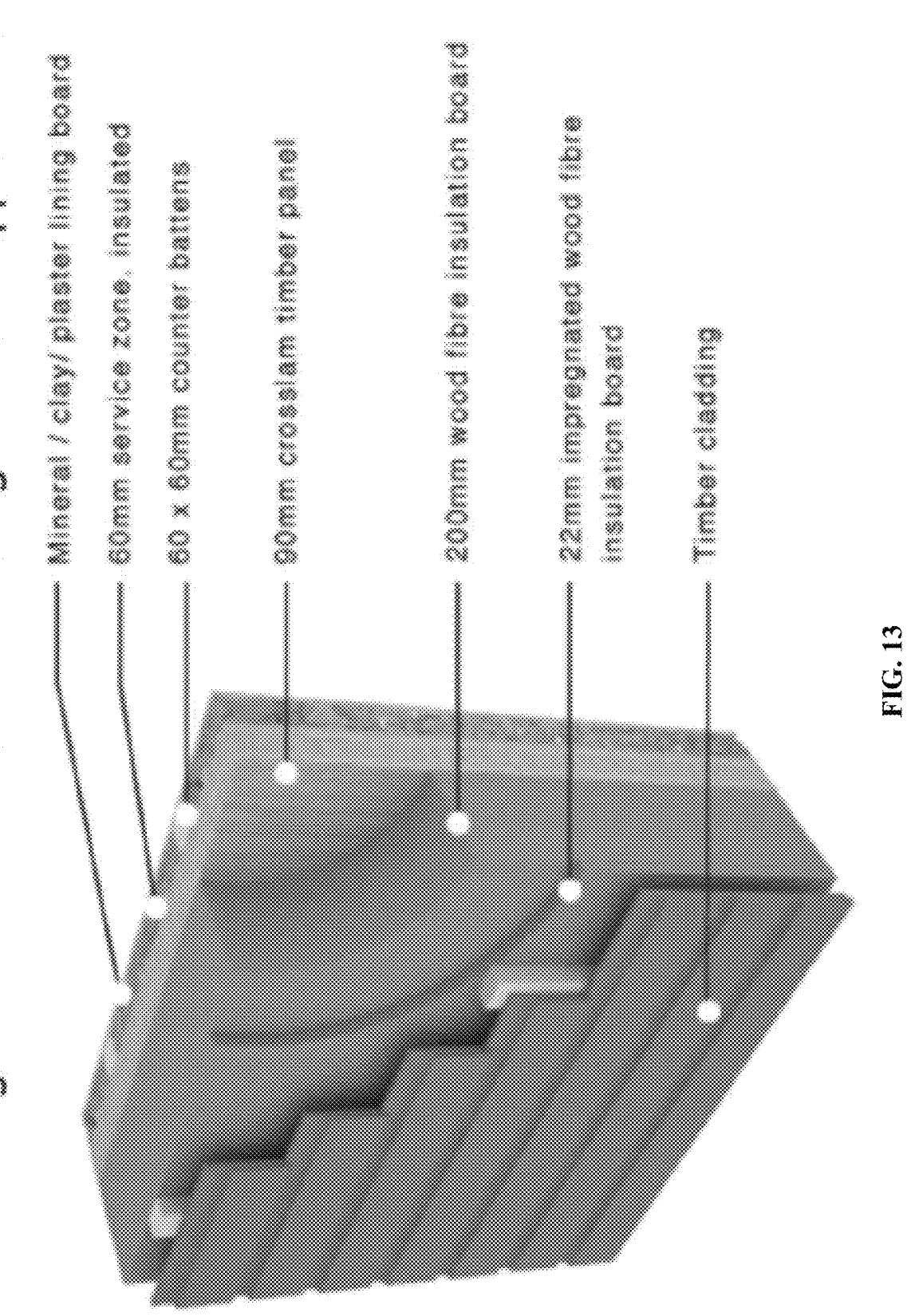
FIG. 13 shows a panel component for a building having layers.

According to an embodiment, FIG. 13 shows a panel component for a building having various arranged layers, including timber cladding, 22 mm impregnated wood fibre insulation board, 200 mm wood fibre insulation board, 90 mm crosslam timber panel, 60 mm×60 mm counter battens, 60 mm service zone (insulated), and mineral/clay/plaster lining board.

According to an embodiment, a building is assembled at a site having the following specifications.

|  | GFA (m2) | GFA (ft2) |
|---|---|---|
| Ground Floor | 60.71 | 653.48 |
| First Floor | 28.907 | 311.15 |
| Deck | 35.64 | 383.63 |
| Total | 125.25 | 1348.25 |

In some embodiments, a building is assembled at a site having other specifications. In particular, a building having other dimensions can be constructed. For example, various buildings can range from 540 sq ft to 1853 sq ft or be outside such sizes. EID and EIM processes are used with all features described herein to implement designs and construct other buildings, such as multi residential units and large homes.

The following table is a comparison of various features of a building constructing using wood frame construction, brick construction, and CLT components (according to some embodiments). A building constructed according to some embodiments can have the various advantages shown.

| Comparison │ Fact Sheet | | | |
|---|---|---|---|
| Quality | Wood Frame Construction | Brick Construction | CTL Components |
| Fire Resistance | 15-30 minutes | Walls 90 min Ceilings~ 10-30 min | 60-150 min | +100-300% improvement |
| Thermal Insulation | Only by additional insulation materials | U-value of 0.2 only with ~80 cm bricks | U-value of 0.2 with 38 cm Holz100 | First static loading-bearing building material that can be used without insulation = passive house values |
| Radiation Shielding E Netz + UMTS 2022 | Attenuation averages 2 dB | 16 dB | 34 dB | Best radiation shielding |
| Toxin Free | Constructed with glued plates, glue, foils, etc. | Sewage sludge disposal in cement + brick production | Pure, untreated wood | Uncompromising for allergy sufferers and those sensitive to air pollution |
| Construction Time/Moisture Content | Available dried | 1-2 years drying time, 5-10 years reinforced concrete | Available dried | The dry CLT components are ready to move in immediately |
| Primary Energy Use | ~3 times energy input as full wood | Brick burning energy | Renewable = solar energy | Building without environmental impact becomes possible |
| CO2 Balance Ecology | Co2 binding through wood-partly low wood content! | The production 1 to cement release about 0.5 of CO2 | 1 to wood binds 2 to Co2 | Building without environmental impact becomes possible |
| Avg. Radioactive contamination compared to outdoor values | Wooden cladding 0 mrem/a, Gypsum plasterboard +5 to 15 mrem/a | +10 to 30 mrem/a | −20 mrem/a | Only the massive wooden house offers lower load values than the ambient radiation |

-continued

| Comparison \| Fact Sheet | | | |
|---|---|---|---|
| Quality | Wood Frame Construction | Brick Construction | CTL Components |
| Quality | Wood Frame Construction | Brick Construction | CTL Components | |
| Windproof/ Condensation | High risk due to violation of vapor barriers and error in small details | Risk of cold spots, concrete falls, etc. | Monolithic wood construction = 100% condensation-free + windproof | Risk reduction to 0 |
| Thermal Quality (in cooling time) | Approx. 10-15 hours | Approx. 120 hours | Approx. 210-360 hours | The higher cooling time is a measure of thermal equilibrium in contrast to the "barrack climate" |
| Wall Surface (after 3 hours of heating) | About 21° Celsius | About 8° Celsius | About 21° Celsius | The best comfort is offered by CLT wall component |
| Wall surface after 210 hours (no heat, outdoor @ 10° C.) | About −8° Celsius | −5.5° Celsius | +6° Celsius | The best comfort is offered by CLT wall component |
| Soundproofing | The lightness of the system is a disadvantage | Brick building is state of the art | Solid wood reaches brick values | CLT components are practically equivalent to solid construction |

FIGS. 15, 16, 17, 18, and 19 show various specifications according to various example embodiments.

Figure 15:
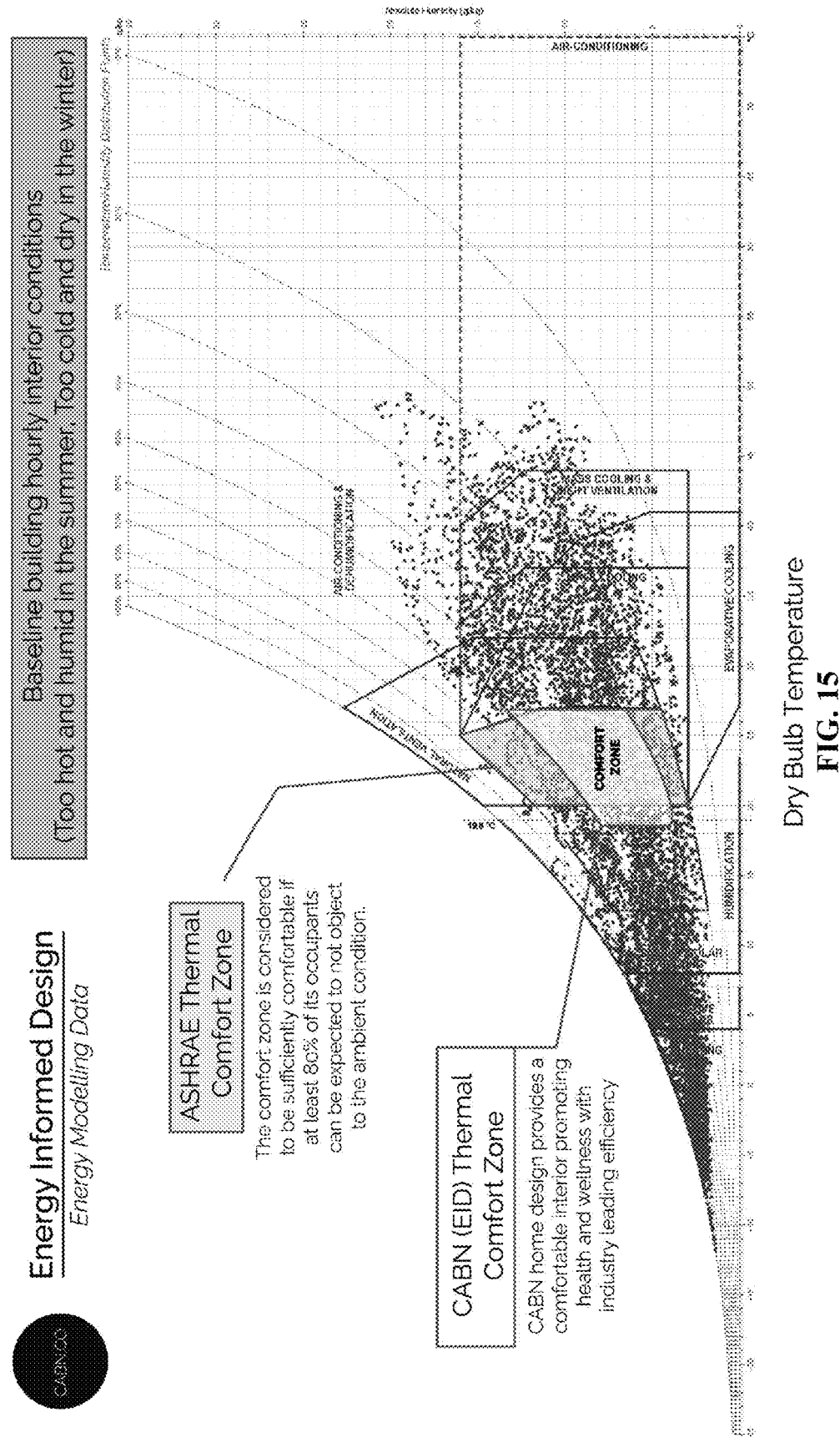
FIG. 15 shows example energy modelling data of hourly temperatures and humidity values.

FIG. 15 shows data modelling an energy informed design according to some embodiments. A thermal comfort zone can be maintained in some embodiments, taking into account heating, active solar, passive solar heating, humidification, internal gains, natural ventilation, evaporative cooling, air conditioning and dehumidification, mass cooling, and mass cooling and night ventilation, such as depicted. Various of these factors can be modulated to achieve the comfort zone. The energy informed design implemented according to some embodiments is configured to arrange standardized components into optimal configuration(s) to maintain ASHRAE thermal temperature standards with reduced energy requirements such as exemplified in FIG. 15.

FIG. 15 shows a study of the variable temperature of a building without using energy informed design (EID) in the dots in a parametric graph, while the EID buildings as implemented according to some embodiments allow for the temperature to remain in the highlighted area through design and the integrated technologies. CABN is referred to herein as an example of embodiments described herein.

FIGS. 16 and 17 show example particulars for a building maintained according to some embodiments.

FIGS. 18 and 19 show example advantages of a building, referred to as having Composite Components, maintained according to some embodiments.

Embodiments as described herein can implement industry leading energy efficient smart homes for unique locations around the world allowing you to live anywhere; whether it's an addition to your home in the city or a new home on a lake or mountain. Using our innovative prefabricated component strategy combined with energy modelled design and renewable energy technology you can live affordably and sustainably anywhere. The energy informed design combined with biophilia ensures you live comfortably without the cost, and through smart home technology, you can remain connected to the world. Embodiments as described herein can be configured for various climates and conditions and settings, such as mountain, snow, city, beach, dune, and lake, among others.

Embodiments of the configured buildings are designed for optimal interior comfort through seasonal variation maintaining ideal temperatures, humidity and air quality inside the house. Energy informed modeling explores energy efficiency and consumption, taking into account all building design variables.

In some embodiments, EID modeling is configured to produce structures that remain in the optimal comfort zone with little energy needed for excess supplemental heating and cooling systems. In some embodiments, the EID modeling is configured to take into account: orientation, location, occupancy rate, building insulation values, ventilation and infiltration (economizer, air-change rate & use), exterior fenestration (SHGC, U-value, r-value, area ratio), shades implementation (fixed, moveable, size & orientation, manual vs automated), and component configuration such as described herein.

An example building configured according to some embodiments has the following specifications.

CABN Home for 600 sq ft: Cooling (kWh): 1,324|Heating (kWh): 1,080|Total Annual Energy (kWh): 2,404 kWh/year Standard Energy Efficient Home for 600 sq ft: Annual Energy (kWh): 6485 kWh/year Traditional home for 600 sq ft: Annual Energy (kWh): 9197.397 kWh/year An example embodiment will now be described. This embodiment will be referred to as CABN and/or CABN.CO.

Net Zero Design Strategies

What is Net-Zero?

Net Zero Energy is defined by the use of energy conservation, energy efficiency, and on-site renewable energy generation to account for 100% of a targeted building's or community's energy usage.

In some embodiments, CABN net-positive energy strategy uses integrated systems for renewable energy with Solar Panels and a leading battery storage system. Net-zero status is achieved by using a combination of renewable power generators and low-energy building techniques, such as Passive Haus building design strategies, CABN's Energy Informed Design (EID), building orientation strategies, efficient heating and cooling systems, high performance insulation, windows and doors and innovative domestic hot water technology.

Producing CABN buildings with solar panels contributes to the electric grid and reduces the cost of electricity for residents, according to some embodiments. Today, solar panels technology has become more competitive, boosting from the home systems to the municipal electrical grid, reducing ongoing maintenance and living expenses.

a. Orientation and Passive Solar Gain

Figure 21:
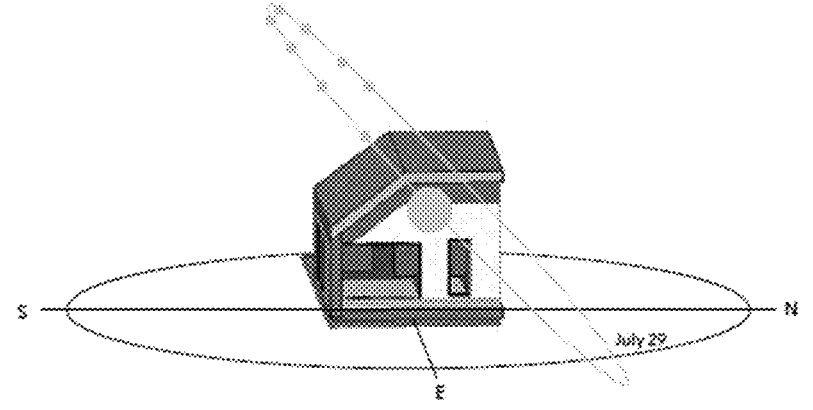
FIG. 21 shows roof orientation optimized in accordance with solar azimuth.

Orientation to the sun and passive solar gain alter the thermal temperature and energy inside all buildings, according to some embodiments. In some embodiments, using Energy Informed Design (EID) CABN.CO buildings are performance optimized for the heating and cooling of the building due to changes in solar gain (sun exposure). Through orientation, window optimization and shade strategies the CABN buildings minimize fluctuations in peak hot and cold temperature and minimize energy consumption to maintain thermal comfort (as shown in FIG. 20 and FIG. 21).

b. Solar Roof Renewable Energy Strategy

In some embodiments, CABNs are designed as a highly efficient building structure that reduces solar gain in summer months through shading and window placement and takes advantage of solar gain in winter months through orientation, wall and roof angles. The buildings reduce overall energy requirements to maintain thermal comfort while also optimizing roof orientation for peak solar energy generation all year round (as shown in FIG. 22).

c. Glazing, Thermal Bridging and R-Value

Figure 23:
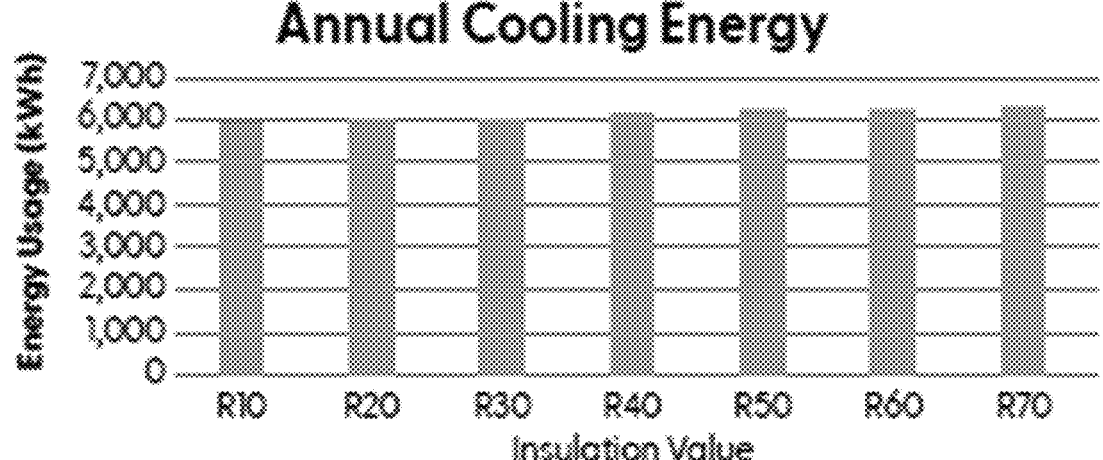
FIG. 23 shows annual cooling energy data in the form of a bar graph of insulation and energy usage values.
Figure 24:
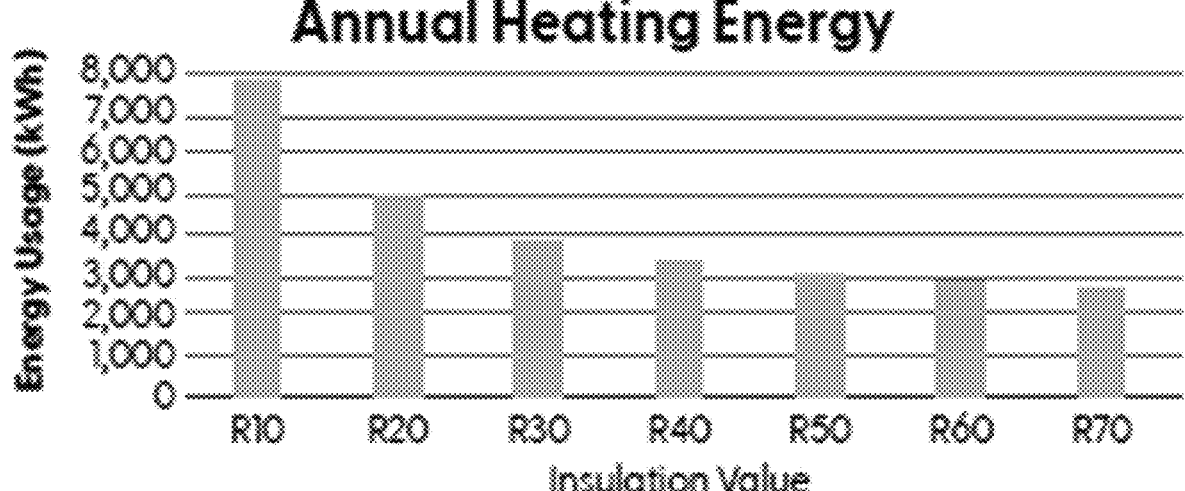
FIG. 24 shows annual heating energy data in the form of a bar graph of insulation and energy usage values.

In some embodiments, CABN.CO Glazing and Thermal Bridging strategy includes high performance windows while minimizing energy loss. The Energy modeling analysis rates the wall insulation R-values at R-37 for optimal performance of the building. R-values are essential to reduce energy usage and improve efficiency. In some embodiments, the Energy modeling takes ASHRAE 62.1-2019 energy standard to define the acceptable combination of temperature and humidity that CABN.CO incorporates to perform thermal comfort. In some embodiments, optimal performance is addressed when considering the annual cooling and heating energy demand of the building, as is illustrated below (as shown in FIG. 23 and FIG. 24).

d. CABN Window Orientation and Insulation Strategy

Figure 25:
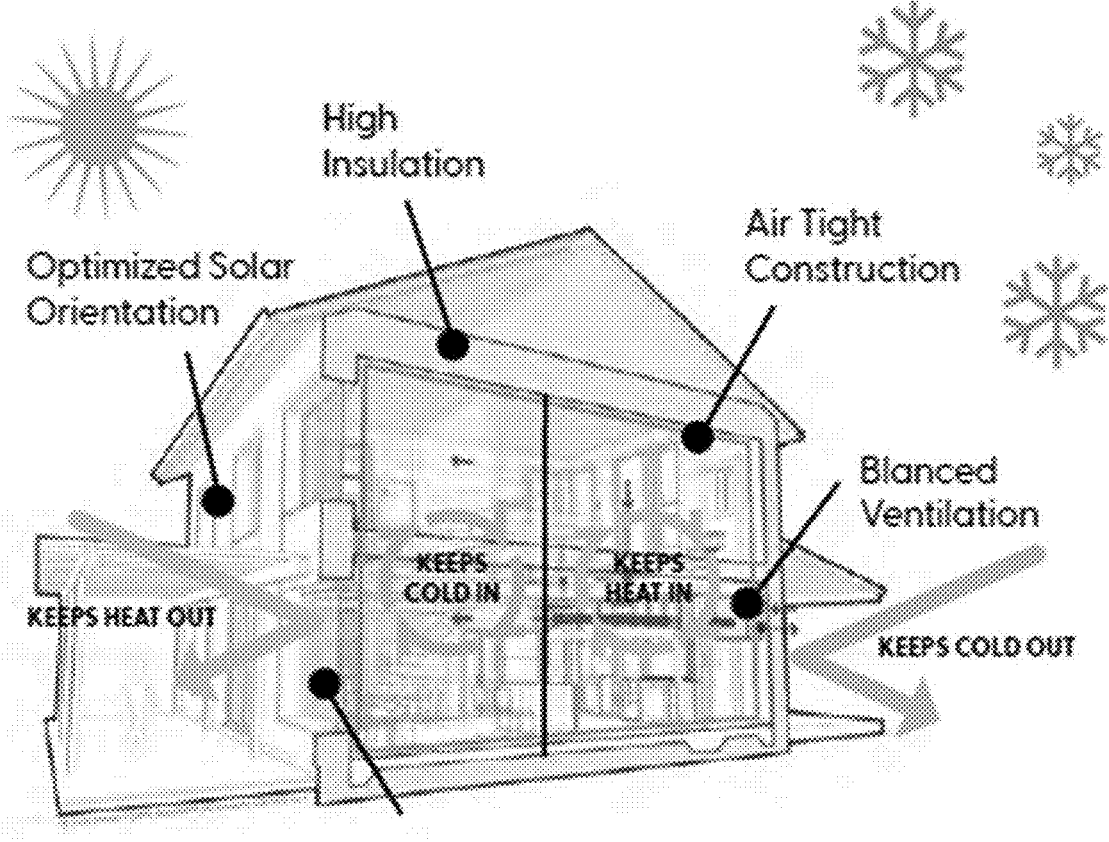
FIG. 25 shows energy efficient features of a building designed using energy efficient modelling.
Figure 26:
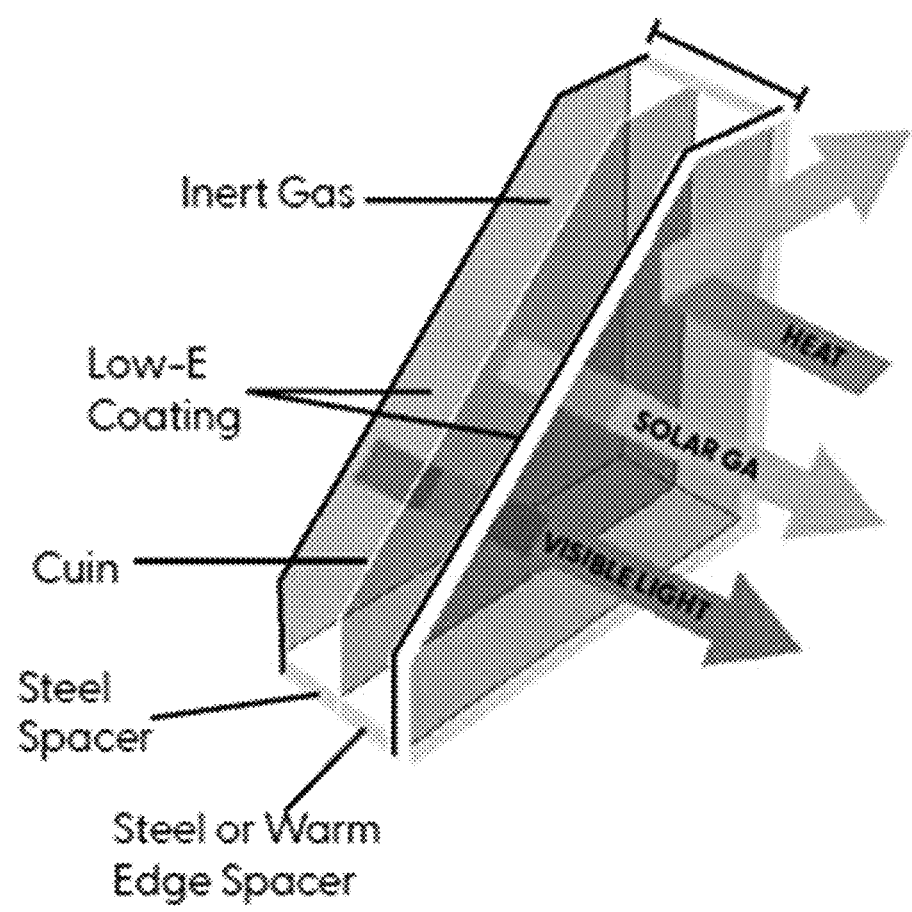
FIG. 26 shows a cross-section of an energy efficient designed window.

In some embodiments, CABN.CO high performance window strategy accounts for insulation and solar gain in relation to window orientation. In some embodiments, CABN.CO Energy informed design (EID) accounts for an average window U-value of 0.8 W/(m^2*K) throughout the entire structure with allowances of the increased solar gain and reduced U-Value strategies on southern oriented windows. This allows passive internal temperature management through strategic solar gain and loss, while maintaining a high performing average u-value window throughout the structure (as shown in FIG. 25 and FIG. 26).

e. Mechanical Systems

In some embodiments, the Net Zero design strategy assesses the building envelope and evaluates for optimal efficiency using energy-informed design in order to bring the Energy Use Intensity (EUI) as low as feasible. This strategy reduces the size and complexity of the mechanical systems and improves indoor thermal comfort without heavy reliance on the HVAC system. Domestic Hot water heating and cooling are the two large categories of energy use in typical homes. In some embodiments, each CABN uses the latest heat pump technology in order to reduce the two biggest uses of electricity. Utilizing a heat pump for space heating can reduce energy usage to less than one-third of conventional gas or electric resistance heaters. New advancements in refrigerants for domestic water heaters allow for R-744 which has a global warming potential (GWP) of 1, compared to common R-410 which has a GWP of 2088.

New advancements in heat pump technology allow for the domestic hot water heater and Heat/Cool heat pump system to operate down to −20 F. In some embodiments, the domestic hot water system utilizes a storage tank with an outside condenser so that hot water can be provided on-demand without the high kW draw of instantaneous hot water heaters. In some embodiments, the heating and cooling heat pump system utilizes the space above the bathroom ceiling for the fan coil. This reduces system noise and provides a clean integrated design that does not distract from the beautiful exposed timber interior.

Figure 27:
FIG. 27 shows a HVAC system modulated by a learning thermostat for a building.

Having a tight, well-insulated envelope, and efficient heat pump units allow for a low EUI that enables the rooftop PV to meet the building's electrical needs, according to some embodiments. With such a tight envelope that has low leakage, a heat recovery ventilator brings in the fresh air. In some embodiments, this system exchanges the energy (not the air) from the building exhaust system to incoming air to preheat or pre-cool outside air to provide a more neutral air temperature to space. This system balances the ventilation and exhaust so the right amount of outside air gets to the space while keeping the space at neutral pressure. The HVAC system is controlled via a learning thermostat that adapts to the needs of the occupant (as shown in FIG. 27).

Home Energy Management

Internet and Smart Home Technology

In some embodiments, CABN.CO integrated home energy management system ensures energy efficiency and temperature comfort all year round. In some embodiments, smart home technologies collect plug load and energy heating and cooling data throughout the entire year. In some embodiments, intelligent control systems along with app enabled devices allow for improved energy efficiency.

Through Smart home technology systems occupants can optimize their energy consumption throughout the duration of ownership.

In some embodiments, CABN.CO buildings leverage the latest in IoT technology to allow for full control of buildings electrical devices, view solar PV production. Change temperature from anywhere, view security systems remotely, and control air quality.

In some embodiments, automatic shading devices and dimmable lighting control allow for the ability to have full control of your environment. Depending on the climate, humidification can be added for increased comfort and health. The building can include automatic humidification based on a monitored climate condition. For example, the building can have sensors to sense the humidity, temperature, or other factors in the environment inside and/or outside the building and automatically adjust humidification, shading, lighting, temperature, energy consumption, or other factor inside the building or inside components of the building based on same.

In some embodiments, the building is configured with a smart home energy management system. This can allow an occupant to stay connected for work, get connected to nature, and connect with the energy of their home.

Biophilic Design

In some embodiments, biophilic benefits increase wellness, creativity, and productivity.

Figure 28:
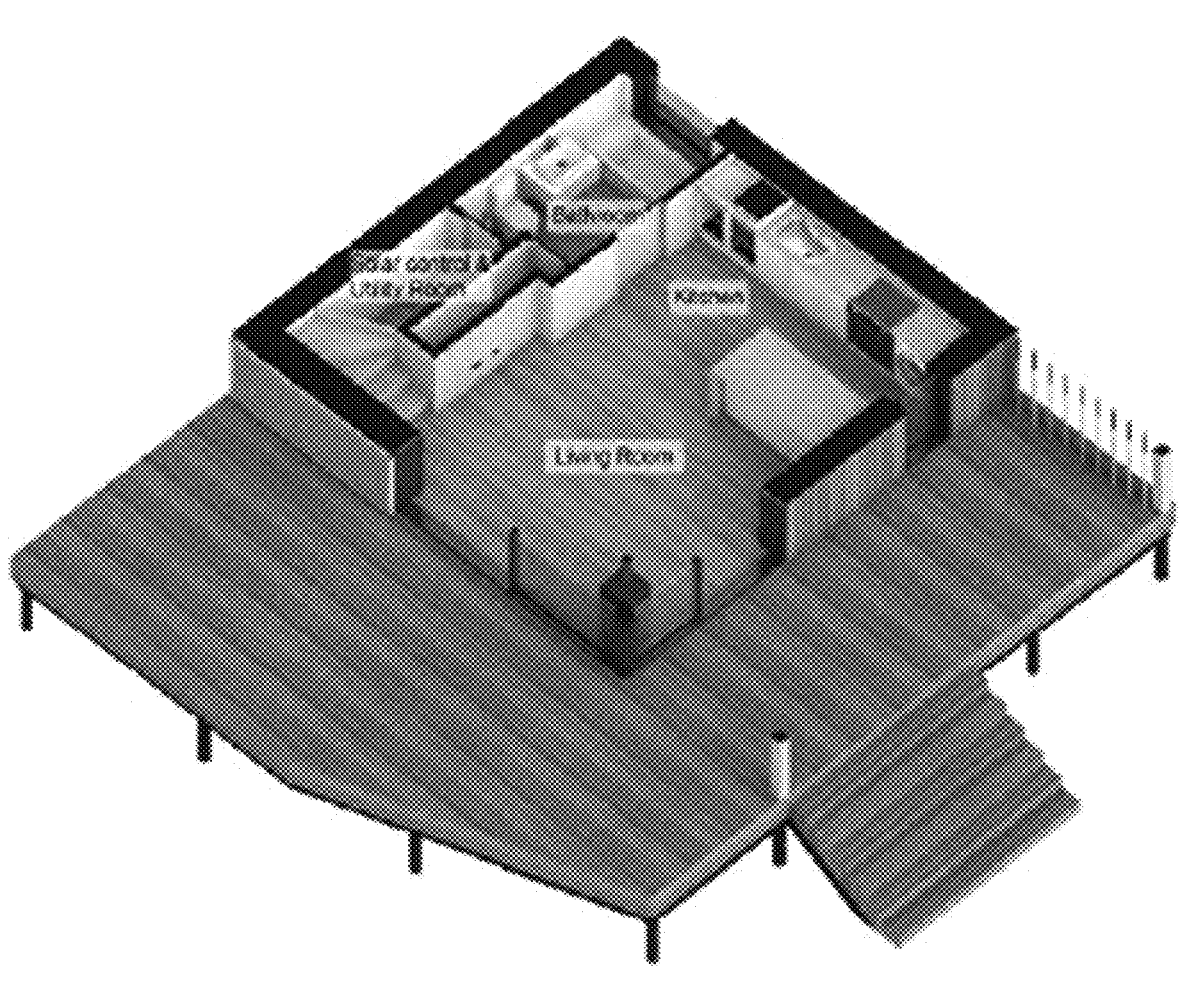
FIG. 28 shows the layout for the ground floor of a building.
Figure 29:
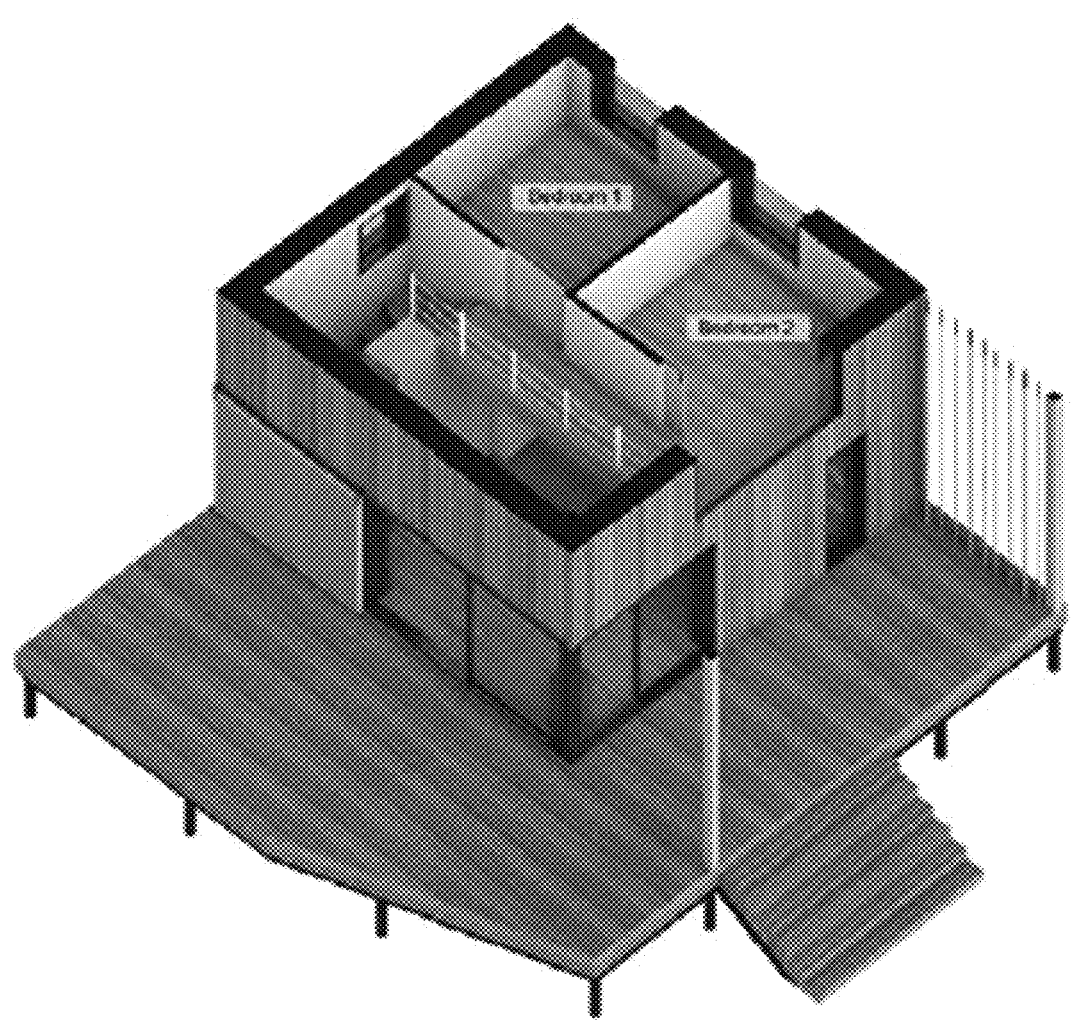
FIG. 29 shows the layout for the second floor of a building.

In some embodiments, CABN.CO Energy Informed Design (EID) creates a double interaction between the affiliation to nature and solving human problems. CABN connection with the environment is evident from the abundance of natural light, natural materials, and indoor outdoor connection. In some embodiments, the physical manifestation of nature as well as nature reflecting from colours, objects, sequences and shapes are incorporated into the building (as shown in FIG. 28 and FIG. 29).

Biophilia is the innate, biological connection humans share with nature. The founder of the concept of biophilia believed that contact with nature is a basic human need. Studies have shown that daylight regulates our mood, the speed of digestion, and development of new cells. Just like a daily dose of healthy food and exercise is important, a daily dose of nature is needed to help feel our best.

Most of today's homes lack biophilic design as a part of the architecture. Spaces that lack this design principle can feel bland, sterile, uninviting, or plain. In some embodiments, CABN buildings incorporate biophilia, feel comfortable, are inviting and integrated into their natural environment.

In some embodiments, the building is configured to enable biophilic wellness and conscious living including a healthy kitchen design. The building has a design, size and style for an artistic home with quality sustainable materials.

CABN Standardized Prefabricate Composite Strategy

In some embodiments, CABN.CO Component strategy encourages the use of sustainable materials to reduce carbon emissions and lower the impact of construction. In some embodiments, CABN.CO structures use standardized prefabricated floor ceiling and composite Cross Laminated Timber (CLT) walls optimized for their required structural, sustainable and energy-efficient qualities. In some embodiments, these components are configured with CABN.CO EID software and allow it to be the optimal construction material to achieve a net-zero building with a minimal carbon footprint. CABN sustainable component strategy allows easy transportation and assembly of CABNs (buildings) in remote, cost-prohibitive and difficult to construct locations. This includes high-density urban settings, remote communities, Northern Canadian communities, locations without access to utilities and underserved communities. This provides access to sustainable and affordable housing to more people across more locations in Canada.

Figure 30:
FIG. 30 shows the advantages of buildings designed using energy efficient modelling.

As shown in FIG. 30, CABN.CO component CLT proposes a multitude of advantages in terms of performance and sustainability of the environment.

Environmentally Friendly

Cross Laminated Timber (CLT) is designed to replace structural steel and concrete for low rise multi residential housing. This structural technology requires less maintenance, less energy and water along with a carbon neutral footprint, which benefits the overall community.

Durable

In some embodiments, cross Laminated Timber (CLT) fulfills the requirements of modern building material allowing the structure to be unique and intricate. Its strong structure make the CLT quality more durable than standard construction strategies.

Recyclable

Cross Laminated Timber (CLT) is an engineered fabricated product that produces little on-site waste. Additionally, the waste produced is recycled by sending back to the manufacturer for reuse or alternatively can be compressed into pallets or chips to be burned in a similar way as coal.

Sustainable Disposal

In some embodiments, cross laminated timber has a higher thermal efficiency than traditional stick build construction and acts as a strong insulator while remaining easy to demolish within a small period due to the lightweight property of CLT. The waste can be recycled or reused hence, decreasing the labor costs during construction as well as deconstruction.

End-of-Life Recyclable

In some embodiments, CABN components are naturally biodegradable and recyclable.

Design Flexibility

In some embodiments, the thickness of cross laminated timber can be easily increased for longer spans using less support elements in the interior.

Cost Effective

As per study by FP innovators (A private not-for-profit R&D organization) in 2010 that specializes in the creation of solutions that accelerate the growth of the Canadian forest sector), the cost of CLT Components as compared to concrete and steel for Mid-rise residential building was 15% less, Mid-rise non-residential building and low-rise educational building was 15-50% less Low-rise commercial building was 25% less One-story industrial building was 10% less

Non-Invasive Architecture

In some embodiments, CABN.CO uses non-invasive site development strategies based on the specific site requirements for each project. In some embodiments, engineers assess each site and recommend the least invasive and best suited strategy based on building specifications, building purpose and site requirements. In some embodiments, a preferred non-invasive site strategy is Helical and Screw piles. When possible, in some embodiments, CABN uses Helical Piles foundations.

The Helical Piles are a non-invasive construction technique minimizing the impact on the soil and their installations need few machines expelling carbon dioxide to the environment. The helical piles facilitate manufacturing and transportation and allow prompt installations and easy adjustments or removals.

In some embodiments, the non-invasive construction strategy allows installations on multiple ecosystems, reduces construction cost, and reduces environmental impact. In some embodiments, CABN.CO foundations are cheaper than concrete, and steel structures as helical piles save installation, transportation and long-term costs since reduced mess and re-usability of screw piles makes this technology quite cost-effective.

In some embodiments, CABN.CO Foundations are suitable for all seasons and climates and can substitute concrete in remote areas. Helical and screw piles embrace transportation and climate conditions.

In some embodiments, more opportunity in site selection is enabled due to less reliance on standard construction technologies, utilities and skilled workers. This can allow for off-grid capabilities, solar, reduced water use; and year-round comfort for all-weather/locations. A home can be constructed more quickly according to some embodiments. The buildings can be used as temporary housing, a guest home, or a vacation house.

Helical Piles Vs Concrete

Modern day builders trying to implement sustainable building practices can look for alternatives to concrete when creating foundations for their building projects. Helical pile foundation systems might be the one of the best sustainable alternatives out there, and here are a few reasons why, according to some embodiments.

Figure 31:
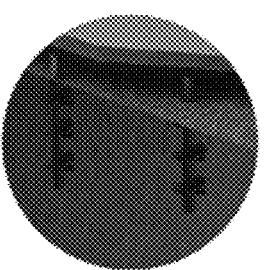
FIG. 31 shows helical piles.
Figure 32:
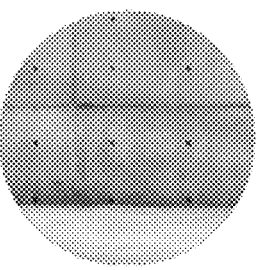
FIG. 32 shows a portion of a concrete foundation.

| | As shown in FIG. 31: | As shown in FIG. 32: |
| --- | --- | --- |
| Machinery and Manpower | ✅ Helical piles don't require any specialized machinery to install, and the installation can be carried out by a small crew | ❌ Concrete foundations require specialized machinery to process, transport, pour, and level, as well as a large team to carry it all out. |

-continued

| | As shown in FIG. 31: | As shown in FIG. 32: |
| --- | --- | --- |
| Environmental Sustainability | ✅ Helical piles are very simple to manufacture and install. They are easy to transport because of their size, and they arrive ready to be installed | ❌ Concrete foundation installation leaves a huge carbon footprint from the machinery, process, and materials required. Concrete manufacturing is one of the leading producer of greenhouse gases |
| Practical and Serviceable | ✅ Due to their size and design, helical piles can be easily replaced, repaired, expanded, or removed using simple machinery and techniques | ❌ Any service or repair that a concrete foundation requires will call for the same specialized machinery and energy output that installation requires |
| Recyclable | ✅ Helical piles can be removed and refurbished, and reused as foundation at other worksites, without the massive impact of the concrete carbon footprint | ❌ Concrete can be reused, but the act of removing old concrete and processing it into reusable concrete involves massive carbon emissions from the same specialized machinery |

Location

In some embodiments, CABN.CO units can be placed almost anywhere. In some embodiments, through the use of CABN.CO component strategy the buildings are sustainably prefabricated in components allowing efficient shipping to site and fast non-invasive site assembly.

Location Analysis

In some embodiments, site analysis identifies environmental conditions and protects the integrity of the site's natural features and guides the assembly and performance of the building. CABN integration with the environment increases home comfort and reduces long-term costs and maintenance. In some embodiments, using Energy Informed Modeling and Environmental strategies CABN.CO can identify local patterns such as solar positioning, climate and environment conditions for the buildings to optimize comfort.

Shipping and Assembly

In some embodiments, CABN.CO Components fit within a 40' container and are efficiently shipped to location and assembled faster than traditional construction methods.

Waste and Water Strategy

In some embodiments, CABN.CO implements non-invasive and environmental waste and water strategies based on the specific site requirements for each project. In some embodiments, each site is assessed and the least invasive and best suited strategy is recommended based on building specifications, building purpose and site requirements.

Water Efficiency

In some embodiments, water-efficient technologies are implemented and have benefits. One or more of the following can be implemented in a building, based on site analysis, for example.

Rain Water Harvesting: In this technique, rainwater is collected from the rooftop, filtered and deposited into the reservoir, which it is used for gardening and domestic use. It is an efficient technique in dry states where rainwater can be purified and stored to be used for washing.

Grey Water Recycling: Greywater is untreated water generated from bathroom sinks and kitchen sinks. It can be treated by a mechanism of filtration, sedimentation, flotation, digestion, and disinfection to be used for irrigation and washing purposes but it is not safe for drinking because of the presence of organic matter in it.

Low Flow Plumbing Fixtures: Huge quantities of water are saved by using plumbing fixtures that are designed to operate with less water consumption.

Sewage System

In some embodiments, CABN Technology recommends sustainable compact treatment options for individual units that do not have access to it.

Mission

In some embodiments, CABN.CO provides solutions for sustainable and affordable housing and shows how the technology can improve lives and provide equitable housing to all individuals and Canadians.

The real-estate market has become unaffordable for communities around Canada. Not only do major residential areas like Toronto, Vancouver or Montreal have a housing deficit, also rural and remote communities have found many difficulties accessing a home, either rental owned with the minimum living standards. Our approach is contributing smart and fast. In some embodiments, CABN.CO technology is usable to build modular units.

In some embodiments, a household making the average annual income for the region can afford a CABN and have monthly payments not in excess of 30% of net income.

In some embodiments, CABN provides sustainable and equitable housing option for communities and individuals. CABN.CO can be used to overcome the barriers of transportation, location, and cost to assemble sustainable housing with the right to live in health and happiness for all people. In some embodiments, housing inequities for thousands of individuals can be minimized by providing sustainable and affordable homes supporting the diverse culture and communities of Canada.

Development Strategy in Some Embodiments

|  | GFA (m²) | GFA (ft²) |
| --- | --- | --- |
| Ground Floor | 60.71 | 653.48 |
| First Floor | 28.907 | 311.63 |
| Deck | 35.64 | 383.63 |
| Total | 125.25 | 1348.25 |

In some embodiments, CABN units can be assembled at any lot area with the following specifications:
1) Within a low residential area
2) Within a rural residential area
3) Within a mix-use area In some embodiments, to be able to agree with zoning regulations, there are currently instruments and tools in place that can help with local permits for separate units.

Additional Residential Units (ARU)

In accordance with Bill 108, Municipalities are required to have Official Plan and Zoning By-law provisions to authorize the use of ARUs. The Act allows ARUs on a lot with a primary residential unit being a detached house, a semi-detached house or a rowhouse (townhouse). One ARU may be in the same building as the primary residential unit and one ARU may be in the accessory building on the same lot.

The amendments to the Planning Act through Bill 108, are supplemented by the Ontario Regulation 299/19 that requires one parking space for each ARU (unless exempt in the Zoning By-law) that may be a tandem parking space; allows occupants of an ARU to be the property owners, relatives of property owners or any other person; and permits ARUs regardless of the date of construction of a primary residential unit.

Tiny Homes

Bill 108 amends the Planning Act and Development Charges Act. came into effect to make building additional residential units on properties easier. Subsection 16(3) of the Planning Act requires municipalities to adopt official plan policies that authorize the use of additional residential units in both the primary residential units and in another building on the same property. Municipalities may also permit the use of tiny homes on the same property as other residential units.

Garden Suites

Garden Suites is a tool that municipalities are using to meet goals in housing, intensification and redevelopment. The modular houses have a kitchen and a bedroom area. The municipalities issue a temporary pass for up to 20 years as these are modular units.

Cost

In some embodiments, CABN implements sustainable buildings that aims to reach maximum energy efficiency and decrease costs. Traditional construction strategies focus on initial construction cost while ignoring the cost of the structure long-term in both environmental and monetary impact. There is now a requirement and responsibility in construction to not only reduce initial costs but also maintain long-term economic and environmental performance.

In some embodiments, renewable energy technologies are used to address rising energy costs through an initial investment allowing savings during operational and maintenance phases. For instance, the strategic use of buildings finishes that do not require repainting, the additional energy to reduce utilities costs over the lifespan of the panel, the use of biofuel and a transition of kitchen waste to biogas for cooking are all examples of sustainable strategies that promote affordable living long term. There are three lifecycle costs that need consideration to kick-off the construction project which is as follows (as shown in FIG. 33):

Initial Cost: Initial costs are also known as development cost and acquisition cost. This cost includes the creation, renovation, building acquisition, consultation, materials, and completion costs.

Cost in use: Cost in use is known as operating cost and running cost. This cost is determined by the choices made at the initial stage leading to decisions taken at the manufacturing and application process.

Recovery cost: Recovery costs the cost of reusing materials or the demolition of the building but it is often overlooked however, it contributes to the life cycle cost.

Various embodiments of the invention have been described in detail. Since changes in and or additions to the above-described best mode may be made without departing from the nature, spirit or scope of the invention, the invention is not to be limited to those details but only by the appended claims. Section headings herein are provided as organizational cues. These headings shall not limit or characterize the invention set out in the appended claims.

What is claimed is:

1. A method for constructing a building at a construction site, comprising:

executing, using at least one first processor, an energy informed model (EIM) configured for:

identifying a location associated with the construction site;

determining (i) historical climate data associated with the location, and (ii) a latitudinal solar azimuth at the location, averaged over a year;

determining a solar gain at the location, at any point in the year, based on the averaged solar azimuth and compensated with the historical climate data; and based on the solar gain, determining an optimal building configuration that (i) minimizes solar gain inside the building at weather temperatures above 24° C. at the location, and (ii) maximizes solar gain inside the building at weather temperatures below 21° C. at the location, wherein determining the optimal building configuration includes determining: (i) insulation properties for floors and walls of the building, (ii) placement of windows and doors around the building, (iii) angles for walls and roofs, and (iv) a building orientation;

assembling the building at the construction site by joining together pre-fabricated components according to the optimal building configuration, wherein the pre-fabricated components comprise walls, floors, windows, doors, and roofs; and controlling, using at least one second processor, a temperature inside the building to within a comfort temperature range between 21° C. and 24° C. by:

monitoring an output of at least one sensor configured to measure one or more of humidity and temperature inside the building; and controlling one or more systems to adjust the temperature within the building to within the comfort temperature range, wherein the one or more systems comprise one or more of automatic: (i) shading devices, (ii) dimmable lighting, (iii) humidification system, (iv) devices for controlling energy consumption, and (iv) heat recovery ventilators.

2. The method of claim 1, wherein the pre-fabricated components are sized and dimensioned to fit within a standard shipping container.

3. The method of claim 1, wherein the pre-fabricated components further comprise one or more of a solar panel, integrated energy system, and hydraulic floor heating system.

4. The method of claim 1, wherein the pre-fabricated components further comprise at least one cross laminated timber wall optimized for energy efficiency.

5. The method of claim 1, wherein the pre-fabricated components further comprise at least one renewable energy system.

6. The method of claim 1, wherein a foundation for the building comprises helical piles.

7. The method of claim 1, wherein the pre-fabricated components are configured with energy informed design software.

8. The method of claim 1, wherein the pre-fabricated components comprise a roof containing a solar panel.

9. The method of claim 1, wherein the energy informed model (EIM) is further configured for:

determining the optimal building configuration based on one or more of orientation data of the location, occupancy rate of the building, building insulation data, ventilation and infiltration data, exterior fenestration, shades implementation, or pre-fabricated component configuration.

10. The method of claim 1, further comprising assembling the building to include one or more of rain water harvesting, grey water recycling, or low flow plumbing.

11. The method of claim 1, further comprising assembling the building to include at least one biophilic design component.

12. The method of claim 1, further comprising assembling the building to include one or more of: an intelligent control system for optimizing energy consumption of the building; an automatic shading device; an automatic dimmable lighting control; automatic humidification based on a monitored climate condition; automatic energy consumption control based on a monitored climate condition; or a heat recovery ventilator controllable by a learning thermostat based on behaviour of an occupant of the building.

* * * * *